United States Patent
Chang et al.

(10) Patent No.: US 7,559,054 B2
(45) Date of Patent: Jul. 7, 2009

(54) ABSTRACT INTERPRETATION WITH A CONGRUENCE ABSTRACT DOMAIN AND/OR A HEAP SUCCESSION ABSTRACT DOMAIN

(75) Inventors: Bor-Yuh Evan Chang, Berkeley, CA (US); K. Rustan M. Leino, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 11/110,108

(22) Filed: Apr. 19, 2005

(65) Prior Publication Data
US 2006/0236311 A1 Oct. 19, 2006

(51) Int. Cl.
G06F 9/44 (2006.01)
(52) U.S. Cl. ..................................................... 717/126
(58) Field of Classification Search ................. 717/126, 717/140–146
See application file for complete search history.

(56) References Cited

U.S. PATENT DOCUMENTS

| | | | |
|---|---|---|---|
| 5,987,252 A | 11/1999 | Leino et al. | |
| 6,031,993 A * | 2/2000 | Andrews et al. | 717/143 |
| 6,070,008 A * | 5/2000 | Korenshtein | 717/122 |
| 6,401,182 B1 * | 6/2002 | Sweeney | 711/171 |
| 6,925,638 B1 | 8/2005 | Koved et al. | |
| 7,024,661 B2 * | 4/2006 | Leino et al. | 717/126 |
| 7,111,233 B1 | 9/2006 | Ballantyne et al. | |
| 7,114,147 B2 | 9/2006 | Ballantyne et al. | |
| 7,120,902 B2 * | 10/2006 | Flanagan et al. | 717/130 |
| 7,168,071 B2 * | 1/2007 | Wu et al. | 717/153 |
| 2001/0044931 A1 | 11/2001 | Kyushima et al. | |
| 2002/0046393 A1 | 4/2002 | Leino et al. | |
| 2002/0112201 A1 | 8/2002 | Flanagan et al. | |
| 2002/0133806 A1 | 9/2002 | Flanagan et al. | |
| 2003/0131284 A1 | 7/2003 | Flanagan et al. | |
| 2004/0060041 A1 * | 3/2004 | Demsey et al. | 717/151 |
| 2005/0066319 A1 | 3/2005 | DeLine et al. | |
| 2006/0206883 A1 * | 9/2006 | Sabbouh | 717/146 |
| 2006/0225034 A1 * | 10/2006 | Peck et al. | 717/106 |
| 2006/0230392 A1 | 10/2006 | Duale et al. | |
| 2006/0248518 A1 * | 11/2006 | Kundert | 717/140 |
| 2007/0089103 A1 * | 4/2007 | Iborra et al. | 717/141 |
| 2008/0295079 A1 * | 11/2008 | Yiftachel et al. | 717/126 |

OTHER PUBLICATIONS

Hudak et al. "Collecting Interpretations of Expressions", ACM, Apr. 1991, ACM Transactions on Programming Languages and Systems, vol. 13, No. 2, pp. 269-290.*

Yi et al. "Automatic Generation and Management of Interprocedural Program Analyses", ACM, 1993, pp. 246-259.*

(Continued)

*Primary Examiner*—Wei Y Zhen
*Assistant Examiner*—Anna Deng
(74) *Attorney, Agent, or Firm*—Klarquist Sparkman, LLP

(57) ABSTRACT

Techniques and tools are described for analyzing software. For example, an analysis tool performs abstract interpretation with a congruence abstract domain and/or a heap succession abstract domain. For the congruence abstract domain, the tool tracks equivalence classes between alien expressions and base domain variables. For the heap succession abstract domain, the tool tracks updates to a heap. In either case, to preserve information after updates, the tool may identify an expression having an unreachable value then determine an equivalent expression that lacks the unreachable value.

16 Claims, 11 Drawing Sheets

OTHER PUBLICATIONS

Bachmair et al., "Abstract congruence closure and specializations," *Conference on Automated Deduction, CADE 2000*, vol. 1831, pp. 64-78 (Jun. 2000).

Chang et al., "Abstract Interpretation with Alien Expressions and Heap Structures," Technical Report MSR-TR-2004-115, 27 pp. (Jan. 2005).

Cousot et al., "Automatic discovery of linear restraints among variables of a program," *Conference Record of the Fifth Annual ACM Symposium on Principles of Programming Languages*, pp. 84-96 (Jan. 1978).

Deutsch, "Static Verification of Dynamic Properties," *Polyspace Technologies, Inc.*, 8 pp. (Nov. 2003).

Gulwani et al., "Join algorithms for the theory of uninterpreted functions," *Proceedings of the 24th Conference on Foundations of Software Technology and Theoretical Computer Science*, 12 pp. (Dec. 2004).

Fahndrich et al., "Adoption and Focus: Practical Linear Types for Imperative Programming," 11 pp. (2002).

Hote et al., "Run-Time Error Detection through Semantic Analysis: A Breakthrough Solution to Today's Software Testing Inadequacies," *Polyspace Technologies, Inc.*, 10 pp. (Sep. 2001).

McCarthy et al., "Correctness of a compiler for arithmetic expressions," *Proceedings of Symposia in Applied Mathematics*, 11 pp. (1967).

Nelson et al., "Simplification by cooperating decision procedures," *Stanford Artificial Intelligence Laboratory Memo AIM-3 11*, 21 pp. (Apr. 1978).

Absint, printouts of pages from the World Wide Web, downloaded on Apr. 19, 2005, 6 pp.

Sagiv et al., "Parametric shape analysis via 3-valued logic," *ACM Transactions on Programming Languages and Systems*, vol. 24, No. 3, pp. 217-298 (2002).

DeLine et al., "Enforcing High-Level Protocols in Low-level Software," 11 pp. (2001).

Abrahám-Mumm et al., "Verification for Java's reentrant multithreading concept," In Foundations of Software Science and Computation Structures, 5th International Conference, FoSSaCS 2002, vol. 2303 of Lecture Notes in Computer Science, pp. 5-20, Springer, Apr. 2002.

Barnett et al., "Friends need a bit more: Maintaining invariants over shared state," In Dexter Kozen, editor, Mathematics of Program Construction, Lecture Notes in Computer Science, pp. 54-84, Springer, Feb. 6, 2004.

Barnett et al., "The Spec# programming system: An overview," *Construction and Analysis of Safe, Secure and Interoperable Smart Devices*, Springer, 21 pp. (2004).

Barnett et al., "Verification of object-oriented programs with invariants," *Journal of Object Technology*, vol. 3, No. 6, pp. 27-56 (Jun. 2004).

Blanchet et al., "A Static Analyzer for Large Safety-critical Software," PLDI 2003, Jun. 9-11, 2003.

Boyapati et al., "Ownership types for safe programming: Preventing data races and deadlocks," In Proceedings of the 2002 ACM SIGPLAN Conference on Object-Oriented Programming Systems, Languages and Applications, OOPSLA 2002, vol. 37, No. 11 in SIGPLAN Notices, pp. 211-230, ACM, Nov. 2002.

Cousot et al., "Abstract interpretation: a unified lattice model for static analysis of programs by construction or approximation of fixpoints," *Conf. Record of the Fourth Annual ACM Symposium on Principles of Programming Languages*, pp. 238-252 (Jan. 1977).

Cousot et al., "Systematic design of program analysis frameworks," *Sixth POPL*, pp. 269-282 (Jan. 1979).

Das, "Unification-based Pointer Analysis with Directional Assignments," PLDI 2000, pp. 35-46.

DeLine et al., "Typestates for Objects," *Proc. European Symp. on Object Oriented Programming*, 26 pp. (2004).

Flanagan et al., "Atomizer: A dynamic atomicity checker for multithreaded programs." In Proceedings of the 2004ACM SIGPLAN-SIGACT Symposium on Principles of Programming Languages (POPL 2004), vol. 39, No. 1 in SIGPLAN Notices, pp. 256-267, ACM, Jan. 2004.

Flanagan et al., "Extended static checking for Java." In Proceedings of the 2002 ACM SIGPLAN Conference on Programming Language Design and Implementation (PLDI), vol. 37, No. 5 in SIGPLAN Notices, pp. 234-245, ACM, May 2002.

"Fugue—Protocol checking for .NET code," 1 page (downloaded from the World Wide Web on Aug. 9, 2005).

Freund et al., "Checking concise specifications for multithreaded software," Journal of Object Technology, 3(6):81-101, Jun. 2004.

Hoare et al., "An axiomatic definition of the programming language PASCAL," *Acta Informatica*, vol. 2, No. 4, pp. 335-355 (1973).

Hoare, "Monitors: An operating system structuring concept," Communications of the ACM, 17(10):549-557, Oct. 1974.

Jones et al., "Flow analysis and optimization of Lisp-like structures," in *Program Flow Analysis: Theory and Applications*, Ch. 4, pp. 102-131 (1981).

Leino et al., "Object invariants in dynamic contexts," In Martin Odersky, editor, European Conference on Object-Oriented Programming (ECOOP), vol. 3086 of Lecture Notes in Computer Science, pp. 491-516, Springer-Verlag, 2004.

Lev-Ami et al., "Putting static analysis to work for verification: A case study," *International Symposium on Software Testing and Analysis*, pp. 26-38 (2000).

Logozzo, F., "Class-level Modular Analysis for Object Oriented Languages," SAS 2003, (2003), pp. 37-54.

Logozzo, "Separate compositional analysis of class-based object-oriented languages," *Proc. of the 10th Int'l Conf. on Algebraic Methodology and Software Technology*, vol. 3116, pp. 332-346 (Jul. 2004).

Nelson, "A generalization of Dijkstra's calculus," *ACM Trans. on Programming Languages and Systems*, vol. 11, No. 4, pp. 517-561 (Apr. 2, 1987).

Noble et al., "Flexible alias protection," In Eric Jul, editor, ECOOP'98—Object-oriented Programming: 12th European Conference, vol. 1445 of Lecture Notes in Computer Science, pp. 158-185, Springer, Jul. 1998.

Owicki et al., "An axiomatic proof technique for parallel programs," Acta Informatica, 6:319-340, 1976.

Qadeer et al., "Summarizing procedures in concurrent programs," In Proceedings of the 2004 ACM SIGPLAN-SIGACT Symposium on Principles of Programming Languages (POPL 2004), vol. 39, No. 1 in SIGPLAN Notices, pp. 245-255, ACM, Jan. 2004.

Savage et al., "Eraser: A dynamic data race detector for multi-threaded programs," ACM Transactions on Computer Systems, 15(4):391-411, Nov. 1997, Also appears in Proceedings of the Sixteenth ACM Symposium on Operating System Principles, pp. 27-37, Operating System Review 31(5), 1997.

Steensgaard, B., "Points-to Analysis in Almost Linear Time," 23rd POPL (1995), pp. 1-10.

Stransky, "A lattice for abstract interpretation of dynamic (LISP-like) structures," *Inf. Comput.*, vol. 101, No. 1, pp. 70-102 (1992).

"Vault—a programming language for reliable systems," 47 pp. (printouts of pages from the World Wide Web, downloaded on Aug. 9, 2005).

Venet et al., "Precise and Efficient Static Array Bound Checking for Large Embedded C Programs," PLDI 2004, (2004), pp. 231-242.

Burdy et al.,"An Overview of JML Tools and Applications," International Journal on Software Tools for Technology Transfer, 13 pages, Jun. 2005.

Chang et al., "Inferring Object Invariants," AIOOL, 12 pages, Jan. 2005.

Detlefs et al., "Extended static checking," Research Report 159, Compaq Systems Research Center, 49 pages, Dec. 1998.

Lahiri, S. K., "Unbounded System Verification Using Decision Procedure and Predicate Abstraction," Ph.D. thesis, Carnegie Mellon University (Sep. 2004) 189 pages.

Leino et al., "Modular verification of global module invariants in object-oriented programs," Technical Report 459, ETH Zürich, 16 pages, Sep. 2004.

Leino, "Toward Reliable Modular Programs," Ph.D. Thesis, California Institute of Technology (1995) (available as Technical Report Caltech-CS-TR-95-03) 183 pages.

Manson et al., "Requirements for programming language memory models," Workshop on Concurrency and Synchronization in Java Programs, in association with PODC, 10 pages, Jul. 2004.

Müller, "Modular Specification and Verification of Object-Oriented Programs," PhD thesis, FernUniversität Hagen, vol. 2262 of Lecture Notes in Computer Science. Springer-Verlag, 293 pages, Oct. 8, 2001.

Poetzsch-Heffter, "Specification and verification of object-oriented programs," Habilitationsschrift, Technische Universität München, 159 pages, 1997.

\* cited by examiner

Figure 1

| if $0 \le x$ then<br>$\quad y := x$<br>else<br>$\quad y := -x$<br>end<br>(a) | if $0 \le o.x$ then<br>$\quad y := o.x$<br>else<br>$\quad y := -o.x$<br>end<br>(b) | $x := 0;\ y := 0;$<br>while $x < N$ do<br>$\quad y := y + x;$<br>$\quad x := x + 1$<br>end<br>(c) | $o.x := 0;\ p.y := 0;$<br>while $o.x < N$ do<br>$\quad p.y := p.y + o.x;$<br>$\quad o.x := o.x + 1$<br>end<br>(d) |

Figure 2

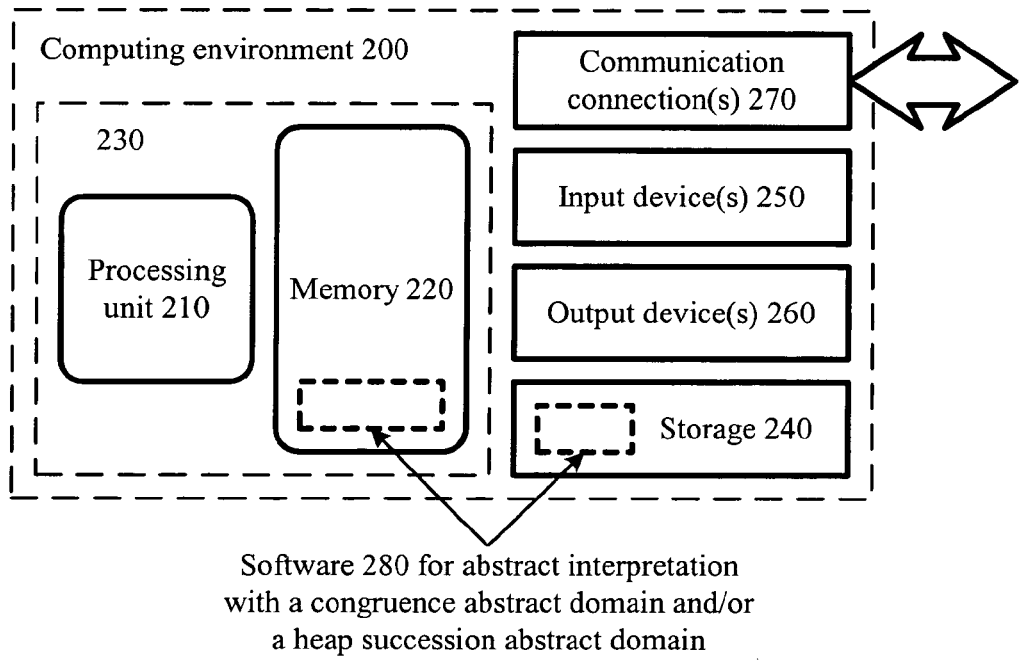

Software 280 for abstract interpretation
with a congruence abstract domain and/or
a heap succession abstract domain

Figure 8 interface AbstractDomain {
    type Elt ;
    ToPredicate: Elt → Expr ;
    Top: Elt ;
    Bottom: Elt ;
    AtMost: Elt × Elt → bool ;
    Constrain: Elt × Expr → Elt ;
    Eliminate: Elt × Var → Elt ;
    Rename: Elt × Var × Var → Elt ;
    Join: Elt × Elt → Elt ;
    Widen: Elt × Elt → Elt ;
}

Figure 9

| | | | |
|---|---|---|---|
| *0* start: | skip | *0* start: | $x := 0$ |
| *1* from *0*: | assume $0 \leq x$ | *1* from *0*: | $y := 0$ |
| *2* from *1*: | $y := x$ | *LoopHead* from *1, 11*: | skip |
| *3* from *0*: | assume $\neg(0 \leq x)$ | *LoopBody* from *LoopHead*: | assume $x < N$ |
| *4* from *3*: | $y := -x$ | *10* from *LoopBody*: | $y := y + x$ |
| *5* from *2,4*: | skip | *11* from *10*: | $x := x + 1$ |
| | | *AfterLoop* from *LoopHead*: | assume $\neg(x < N)$ |

| Block | Lattice Element |
|---|---|
| $L$ start : $s$ | $Pre(L) = Top$ |
| $L$ from $K_1,\ldots,K_n : s$ (non-cut point) | $Pre(L) = \text{Join}\Big(\text{Join}\big(\cdots\text{Join}(Bottom, Post(K_1))\cdots\big), Post(K_n)\Big)$ |
| $L$ from $K_1,\ldots,K_n : s$ (cut point) | $Pre(L) = \text{Widen}\Big(\text{Widen}\big(\cdots\text{Widen}(Bottom, Post(K_1))\cdots\big), Post(K_n)\Big)$ |
| $L$ pred : $x := e$ | $Post(L) = $ let $x'$ be a fresh variable<br>$A = \text{Constrain}(Pre(L), x' = e),$<br>$B = \text{Eliminate}(A, x),$<br>$C = \text{Rename}(B, x', x)$<br>in $C$ end |
| $L$ pred : assume $p$ | $Post(L) = \text{Constrain}(Pre(L), p)$ |

Figure 11

| | | | |
|---|---|---|---|
| *0* start: | skip | *0* start: | $o.x := 0$ |
| *1* from *0*: | assume $0 \leq o.x$ | *1* from *0*: | $p.y := 0$ |
| *2* from *1*: | $y := o.x$ | *LoopHead* from *1,11*: | skip |
| *3* from *0*: | assume $\neg(0 \leq o.x)$ | *LoopBody* from *LoopHead*: | assume $o.x < N$ |
| *4* from *3*: | $y := -o.x$ | *10* from *LoopBody*: | $p.y := p.y + o.x$ |
| *5* from *2,4*: | skip | *11* from *10*: | $o.x := o.x + 1$ |
| | | *AfterLoop* from *LoopHead*: | assume $\neg(o.x < N)$ |

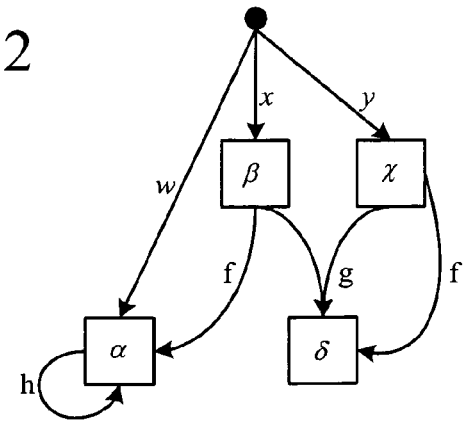

Figure 13A

*Constrain* fun $\text{Constrain}_C\left(\langle G, \vec{B}\rangle : \text{Elt}, p : \text{Expr}\right) : \text{Elt} =$ if $p$ is $e_0 = e_1$ then let $\alpha = \text{Find}(\text{in-out } G, e_0, \vec{B}, \text{in-out } \vec{B})$ in let $\beta = \text{Find}(\text{in-out } G, e_1, \vec{B}, \text{in-out } \vec{B})$ in $\text{Union}(\text{in-out } G, \alpha, \beta, \vec{B}, \text{in-out } \vec{B})$ end if;

for $i := 0; i < |\vec{B}|; i++$ do let $p' = \text{ToUnderstandable}(\text{in-out } G, p, \mathcal{B}_i, \text{in-out } B_i)$ in $B_i := \text{Constrain}_{\mathcal{B}_i}(B_i, p')$ end for;

if there exists an $i$ such that $B_i = \text{Bottom}_{\mathcal{B}_i}$ then $\bot$ else $\langle G, \vec{B}\rangle$ end if end fun fun $\text{ToUnderstandable}(\text{in-out } G : \text{EGraph}, e : \text{Expr}, \mathcal{B} : \text{AbstractDomain}, \text{in-out } B : \text{Elt}) : \text{Expr} =$ case $e$ of $x$ then let $\alpha = \text{Find}(\text{in-out } G, x, [\mathcal{B}], \text{in-out } [B])$ in $\alpha$

| $f(\vec{e}\,')$ then if $\text{Understands}_\mathcal{B}(f, \vec{e}\,')$ then $f(\text{ToUnderstandable}(\text{in-out } G, \vec{e}\,', \mathcal{B}, \text{in-out } B))$ else let $\alpha = \text{Find}(\text{in-out } G, f(\vec{e}\,'), [\mathcal{B}], \text{in-out } [B])$ in $\alpha$ end if end case end fun

Figure 13B fun Union( in-out $G$ : EGraph, $\alpha$ : SymVal, $\beta$ : SymVal, $\vec{B}$ : AbstractDomain[ ], in-out $\vec{B}$ : Elt[ ] ) =
    if $\alpha$ and $\beta$ are different symbolic values then
        Unify( in-out $G, \alpha, \beta, \vec{\mathcal{B}}$, in-out $\vec{B}$);
        while $G$ contains two distinct mappings $t \mapsto \gamma$ and $t \mapsto \delta$ do
            if $\gamma$ and $\delta$ are the same symbolic value then
                remove the redundant $t \mapsto \delta$ mapping from $G$
            else
                Unify( in-out $G, \gamma, \delta, \vec{\mathcal{B}}$, in-out $\vec{B}$)
            end if
        end while
    end if
end fun fun Unify( in-out $G$ : EGraph, $\alpha$ : SymVal, $\beta$ : SymVal, $\vec{\mathcal{B}}$ : AbstractDomain[ ], in-out $\vec{B}$ : Elt[ ]) =
    replace all occurrences of $\alpha$ by $\beta$ in $G$;
    for $i := 0; i < |\vec{B}|; i++$ do
        $B_i := \text{Constrain}_{\mathcal{B}_i}(B_i, \alpha = \beta)$;
        $B_i := \text{Eliminate}_{\mathcal{B}_i}(B_i, \alpha)$
    end for
end fun

Figure 13C fun Find( in-out $G$ : EGraph, $e$ : Expr, $\vec{\mathcal{B}}$ AbstractDomain[ ], in-out $\vec{B}$ : Elt[ ]) : SymVal =
    let $t$ : Term in
    case $e$ of
        $x$ then $t := x$
        | $f(\vec{e}')$ then $t :=$ let $\vec{\alpha}$ = Find( in-out $G, \vec{e}', \vec{\mathcal{B}}$, in-out $\vec{B}$) in $f(\vec{\alpha})$
    end case;
    if $G$ contains a mapping $t \mapsto \beta$ then
        $\beta$
    else
        let $\beta$ be a fresh symbolic value in
        add $t \mapsto \beta$ to $G$;
        for $i := 0; i < |\vec{B}|; i++$ do
            if Understands$_{B_i}(f, \vec{e}')$ then
                $B_i :=$ Constrain$_{B_i}(B_i, t = \beta)$
            end if
        end for
        $\beta$
    end if
end fun

*Rename.* We write $G \setminus t$ for removing $t$ from the domain of $G$.

fun Rename$(\langle G, \vec{B} \rangle$ : Elt, $oldvar$ : Var, $newvar$ : Var) : Elt =
    if $oldvar \in$ domain$(G)$ then
        $\langle (G \setminus oldvar)[newvar \mapsto G(oldvar)], \vec{B} \rangle$
    else
        $\langle G, \vec{B} \rangle$
    end if
end fun

*Eliminate.*
fun Eliminate$(\langle G, \vec{B} \rangle$ : Elt, $x$ : Var) : Elt = $\langle G \setminus x, \vec{B} \rangle$

Figure 14

```
0:   fun Join_C (⟨G_0, B⃗_0⟩ : Elt, ⟨G_1, B⃗_1⟩ : Elt) : Elt =
1:       let G : EGraph in
2:       let B'_0, B'_1 : Elt[] = B_0, B_1 in
3:       let M_0, M_1 : SymVal → SymVal in
4:       let Visited_0, Visited_1 : set of SymVal in
5:       let W : set of Term × SymVal × SymVal =
```

$$\{\langle x, G_0(x), G_1(x)\rangle \mid x \in \text{domain}(G_0) \land x \in \text{domain}(G_1)\}$$
$$\cup \{\langle f(), G_0(f()), G_1(f())\rangle \mid f() \in \text{domain}(G_0) \land f() \in \text{domain}(G_1)\}$$

```
         in
6:       while W is not empty do
7:           pick and remove (t, α_0, α_1) ∈ W
8:           if M_0^{-1}(α_0) ∩ M_1^{-1}(α_1) = {γ} then
9:               add t ↦ γ to G
10:          else
11:              let ρ : SymVal = fresh SymVal in
12:              B'_0 := Constrain_B⃗ (B'_0, α_0 = ρ);  B'_1 : Constrain_B⃗ (B'_1, α_1 = ρ);
13:              add ρ ↦ α_0 to M_0 and ρ ↦ α_1 to M_1;
14:              add t ↦ ρ to G;
15:              add α_0 to Visited_0 and α_1 to Visited_1;
16:              find each f(β⃗_0) ∈ domain(G_0) and f(β⃗_1) ∈ domain(G_1) such that
```

$$\vec{\beta}_0 \subseteq Visited_0 \land \alpha_0 \in \vec{\beta}_0 \land \vec{\beta}_1 \subseteq Visited_1 \land \alpha_1 \in \vec{\beta}_1$$

and add each $\langle f(\vec{\beta}), G_0(f(\vec{\beta}_0)), G_1(f(\vec{\beta}_1))\rangle$ to W such that $$M_0(\vec{\beta}) = \vec{\beta}_0 \land M_1(\vec{\beta}) = \vec{\beta}_1 \land p \in \vec{\beta}$$

```
17:          end if
18:      end while;
19:      ⟨G, Join_B⃗ (B'_0, B'_1)⟩
20:  end fun
```

ABSTRACT INTERPRETATION WITH A CONGRUENCE ABSTRACT DOMAIN AND/OR A HEAP SUCCESSION ABSTRACT DOMAIN

TECHNICAL FIELD

The present application relates to analysis of software. For example, an analysis tool performs abstract interpretation with a congruence abstract domain and/or a heap succession abstract domain.

BACKGROUND

Software systems can include thousands or even millions of lines of computer program text. Not surprisingly, interactions between different parts of the computer program text can be complex and difficult to follow.

Static analysis involves automatic reasoning about computer programs from the text of the computer programs. Static analysis has applications in compiler optimizations and computer software verification, among other things. A compiler typically converts program text into instructions executable on a computer processor. Using static analysis of program text, a compiler can at times identify-problems such as run-time errors in the computer program without even running the program. Or, the compiler may be able to improve the efficiency of the output instructions. Software verification more broadly refers to testing or otherwise evaluating software to verify that the software behaves as expected or has certain desirable properties, or to verify the correctness of the software versus predefined criteria.

One common task of an analysis tool is to infer invariants and other properties of a computer program. An invariant is a condition that always holds. For example, a condition that always holds at the beginning of a loop is a loop invariant, and a condition that always holds for an object is an object invariant. If a developer is the one to indicate invariants or other properties (e.g., by annotating program text or a behavioral specification to signal intended invariants or properties), the process can be time-consuming for the developer. The development process is simplified if a tool can automatically infer invariants and other properties of a computer program.

Abstract interpretation is a form of static analysis that allows an analysis tool to automatically infer invariants and other properties. With abstract interpretation, over-approximations of sets of reachable program states are systematically computed. The over-approximations are conventionally represented as elements of a lattice for an abstract domain. Elements of the abstract domain can be viewed as constraints on a set of variables, such as the variables of the program.

Suppose a program includes the variables x, y, and z as well as statements setting values for the variables and comparing variables. The polyhedra abstract domain can represent linear-arithmetic constraints like $x=5$, $6<y\leq 11$, $x<y$, or $x+y\leq z$ for the program. This allows the abstract domain to track if it is possible for a constraint to evaluate to true and if it is possible for the constraint to evaluate to false.

Or, suppose a computer program includes the simple loop:

```
x := 0
while (x < 10) {
    x := x + 1
}
```

Using abstract interpretation and an abstract domain that tracks interval relationships for variables, an analysis tool may infer and confirm that $x=10$ at the end of the loop. It may also infer and confirm the range of x at different stages. For example, before x is set to 0, the tool infers that $-\infty<x<\infty$. After the assignment $x:=0$ but before the loop starts, the tool infers that $x=0$. In the body of the loop in the first iteration, the tool infers that $x=0$ and $x<10$ before the increment statement, then also infers $x=1$ after the increment statement. At this point, the tool infers that the range of x is 0 to 1. After subsequent iterations, the tool infers that the range of x is 0 to 2, 0 to 3, etc., up to a range of 0 to 10 when $x=10$. Incidentally, if there were no upper bound to the loop (e.g., if the conditional statement was $x>-1$), the analysis could continue indefinitely until the tool stopped it. The tool might loosen constraints in the analysis if the range fails to stabilize, however, then infer that the range of x is 0 to $\infty$.

Different abstract domains might specialize in Boolean logic, or state machine analysis, or system resource (e.g., mutex) access patterns. Developing specialized abstract domains for different areas can be time consuming.

In addition to standard, well-known functions and relation symbols, a computer program may include functions and relation symbols that are customized to the program, to the language of the program, or to the general area of the program. As a result, in abstract interpretation, constraints of interest often involve functions and relation symbols not all supported by any single abstract domain. For example, some computer programs include functions for interacting with "heap" memory. (In general, the heap is an area of computer memory used for dynamic memory allocation, where blocks of memory are allocated and freed in an arbitrary order, and the pattern of allocation and size of blocks may not be known until run-time.) Suppose a constraint of interest in the analysis of a Java or C# program is:

$$sel(H,o,x)+k\leq length(a),$$

where H denotes the current heap, sel(H,o,x) represents the value of the field x of an object o in the heap H (usually written o.x in Java and C#), and length(a) gives the length of an array a. This constraint cannot be represented directly in the polyhedra domain because the polyhedra domain does not support the functions sel and length. Consequently, the polyhedra domain would very coarsely over-approximate this constraint with a lattice element that conveys no information.

This example illustrates some problems with current abstract domains. If a constraint mentions a function or relation symbol that is not supported by an abstract domain, the constraint is ignored by the abstract domain (that is, it is very coarsely over-approximated). Moreover, current abstract domains do not support certain functions and relation symbols for heap management.

SUMMARY

Techniques and tools are presented herein for the analysis of software. The analysis includes, for example, abstract interpretation with a congruence abstract domain and/or a heap succession abstract domain, which facilitates the development and testing of certain types of computer programs. The various techniques and tools can be used in combination or separately.

According to a first aspect of the tools and techniques presented herein, a tool includes software for tracking equivalence classes between multiple alien expressions and multiple base domain variables. For example, the software implements a congruence domain parameterized by multiple base domains, and at least one of the base domains supports analysis of different functions and/or relation symbols compared to the other base domains. The base domains can include a heap succession domain that facilitates tracking of heap updates. The software may operate in conjunction with base domains to query each of the base domains about what expression information is understandable by each of the base domains, and to receive from each of the base domains information about what expression information is understandable within the base domain. The software may also operate in conjunction with base domains to query each of the base domains for a replacement expression for a given expression, wherein the replacement expression does not mention a particular variable.

According to a second aspect of the tools and techniques presented herein, a tool identifies for an abstract domain an expression having one or more unreachable values. The tool determines an equivalent expression that lacks the one or more unreachable values. For example, software implementing the abstract domain includes a routine for providing information about equivalent expressions, where the routine receives parameters in an invocation and returns an equivalent expression.

According to a third aspect of the tools and techniques presented herein, a tool in an abstract domain tracks one or more updates to a memory pool. For example, software implementing the abstract domain facilitates replacement of expressions having one or more unreachable values. As another example, software implementing the abstract domain provides information about what symbols are understandable within the abstract domain.

Additional features and advantages of the invention will be made apparent from the following detailed description that proceeds with reference to the accompanying drawings.

BRIEF DESCRIPTION OF THE DRAWINGS

FIG. 1 shows pseudocode listings for two pairs of simple programs, to illustrate differences in what a tool can infer with and without a congruence abstract domain and heap succession abstract domain.

FIG. 2 is a block diagram of a generalized operating environment for abstract interpretation with a congruence abstract domain and/or heap succession abstract domain.

FIG. 8 shows a pseudocode listing for an abstract domain interface.

FIG. 9 shows listings in an imperative language for programs (a) and (c) of FIG. 1.

FIG. 10 shows listings in the imperative language for Pre( ) and Post( ) equations.

FIG. 11 shows listings in an imperative language for programs (b) and (d) of FIG. 1.

FIG. 12 is a diagram showing an equivalence graph as a rooted directed graph.

FIGS. 13A-13C and 14 show pseudocode listings for abstract domain operations in one implementation.

DETAILED DESCRIPTION

Figure 3:
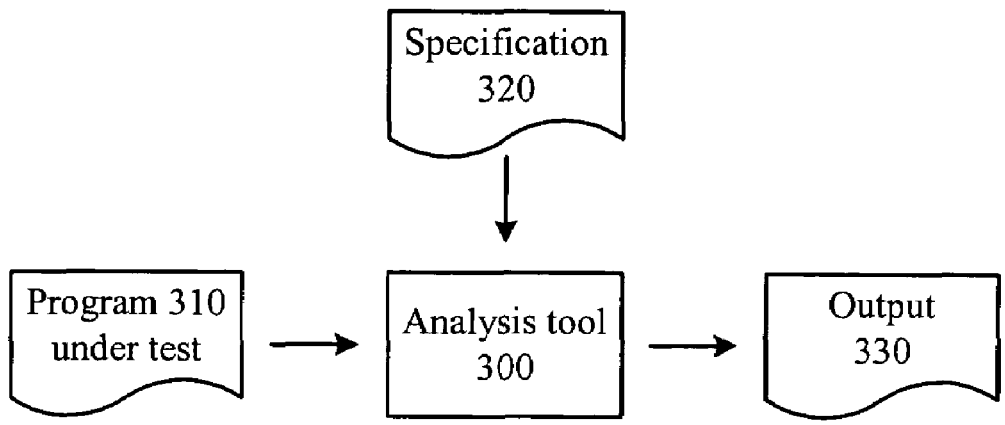
FIG. 3 is a block diagram of a generalized tool for abstract interpretation with a congruence abstract domain and/or a heap succession abstract domain.

The present application relates to techniques and tools for software analysis. In various described embodiments, a software analysis tool (for example, in a compiler or software verification framework) incorporates techniques for abstract interpretation using a congruence abstract domain and/or a heap succession abstract domain. This makes abstract interpretation much more useful for analyzing object-oriented software and heterogeneous software systems with components in multiple different application areas.

In various embodiments described herein, a software analysis tool uses a coordinating congruence-closure abstract domain ("congruence domain" or "congruence abstract domain" for short) rather than rely on support of symbols being built into abstract domains. Multiple examples of a congruence abstract domain and its operations are detailed below. Conceptually, a congruence domain is parameterized by a set of zero or more abstract domains, which are termed base domains, and the congruence domain stores congruence-closed equivalence classes of terms. These equivalence classes are represented with variables in the base domains. For example, a congruence abstract domain introduces variables for use in a base domain to stand for sub-expressions that are alien to the base domain, presenting the base domain with the illusion that these alien sub-expressions are just base domain variables. Equivalence classes may be dissolved as client variables change in the program being analyzed. In some embodiments, so as not to lose too much information, the congruence domain consults its base domains during such changes to help preserve information.

FIG. 1 shows pseudocode listings for two pairs of simple programs. These help illustrate differences in what can be inferred with and without the congruence and heap succession abstract domains. For example, by itself, the polyhedra domain can infer that $0 \leq y$ holds after program (a) in FIG. 1, but it can only infer true after program (b) because the polyhedra domain does not support an operation to read the field of an object in a heap (e.g., o.x). In contrast, the congruence domain (using the polyhedra domain as a base domain) can also infer that $0 \leq y$ holds after program (b) in FIG. 1, since the congruence domain may create an equivalence class mapping the expression o.x to a base domain variable that is used within the polyhedra domain.

Various embodiments also use a specific base domain, the heap succession abstract domain, to track updates to a heap or other pool of memory locations. A heap succession abstract domain is useful in analyzing programs with a heap (such as object-oriented programs), but also applies more generally to programs with arrays and/or records. Programs (c) and (d) of FIG. 1 illustrate one benefit of a heap succession abstract domain. Program (d) involves updates to the heap. The polyhedra domain can infer that $0 \leq x \wedge 0 \leq y$ holds after program (c) in FIG. 1, but it can only infer true after program (d) in FIG. 1. This is the case even if the polyhedra domain is used as a single base domain of the congruence domain, since updates to the fields of objects in the heap are not tracked but instead result in elimination of information in the domains. Using the heap succession domain as a base domain, however, a tool can infer that $0 \leq o.x \wedge 0 \leq p.y$ holds after program (d) in FIG. 1.

Although the operations for the techniques presented herein are typically described in a sequential order for the sake of presentation, it should be understood that this manner of description encompasses minor rearrangements in the order of operations, unless a particular ordering is required. For example, operations described sequentially may in some cases be rearranged or performed concurrently. Stages in flowcharts may be omitted or combined with other stages in some cases. Moreover, for the sake of simplicity, flowcharts typically do not show the various ways in which techniques can be used in conjunction with other techniques.

In some embodiments, the techniques described herein are implemented at compile time. In other embodiments, the techniques are implemented at design time. Alternatively, the techniques are applied at some other time.

While the techniques and tools described herein are in places presented as part of a single, integrated system, the techniques can be applied separately, potentially in combination with other techniques. Different embodiments implement one or more of the described techniques and tools. Various techniques and tools described herein can be used in a tool other than a compiler Or software verification system.

I. Example Operating Environments

FIG. 2 illustrates a generalized example of a suitable computing environment (200) in which several of the described embodiments may be implemented. The computing environment (200) is not intended to suggest any limitation as to scope of use or functionality, as the techniques and tools described herein may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) for abstract interpretation with a congruence abstract domain and/or a heap succession abstract domain.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) for abstract interpretation with a congruence abstract domain and/or a heap succession abstract domain.

The input device(s) (250) may be a touch input device such as a keyboard, mouse, pen, or trackball, a voice input device, a scanning device, a sound card, video card, TV tuner card, CD-ROM or CD-RW, or another device that provides input to the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), and combinations of any of the above.

The techniques and tools can be described in the general context of computer-executable instructions, such as those included in program modules, being executed in a computing environment on a target real or virtual processor. Generally, program modules include routines (e.g., methods, functions), programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "analyze," "determine," and "evaluate" to describe computer operations in a computing environment. These terms are high-level abstractions for operations performed by a computer, and should not be confused with acts performed by a human being. The actual computer operations corresponding to these terms vary depending on implementation.

II. Example Software Analysis Tools

FIG. 3 shows a generalized analysis tool (300) that uses a congruence domain and/or a heap succession abstract domain when evaluating software. For example, the tool (300) is part of a compiler system, software verification system, or other software development system.

The tool (300) works upon or in conjunction with a computer program (310) under test. For example, source code for the computer program (310) is accepted as input by a system incorporating the analysis tool (300). In some implementations, the tool (300) accepts source code for the computer program (310) under test and automatically analyzes it—modifications by the developer to the source code to facilitate the analysis are not required. In other implementations, the tool (300) accesses the computer program (310) during development or at some other time, or the source code for the computer program (310) is annotated or otherwise modified to facilitate the analysis.

In FIG. 3, the tool (300) also accepts a specification (320) such as a behavioral specification or a set of criteria, against which the computer program (310) is evaluated. Alternatively, such criteria are pre-defined for the tool (300) or some combination of pre-defined and provided criteria are used.

The tool (300) analyzes the computer program (310) using abstract interpretation with a congruence abstract domain and/or a heap succession abstract domain. For example, the tool (300) may use the congruence abstract domain by itself or with one or more base domains, and the one or more base domains may include the heap succession abstract domain. Or, the tool (300) may use the heap succession abstract domain but not other abstract domains, for example, directly interacting with the heap succession abstract domain through a test harness customized for such interaction.

The tool (300) produces output (330) for results of the abstract interpretation. For example, the tool (300) produces one or more charts or graphs for the results, marked-up versions of source code for the computer program (310), a list of errors or statistics, or other visual output on a computer display or paper. Alternatively, the tool (300) produces other types of output (330).

III. Example Congruence Domains

Figure 4:
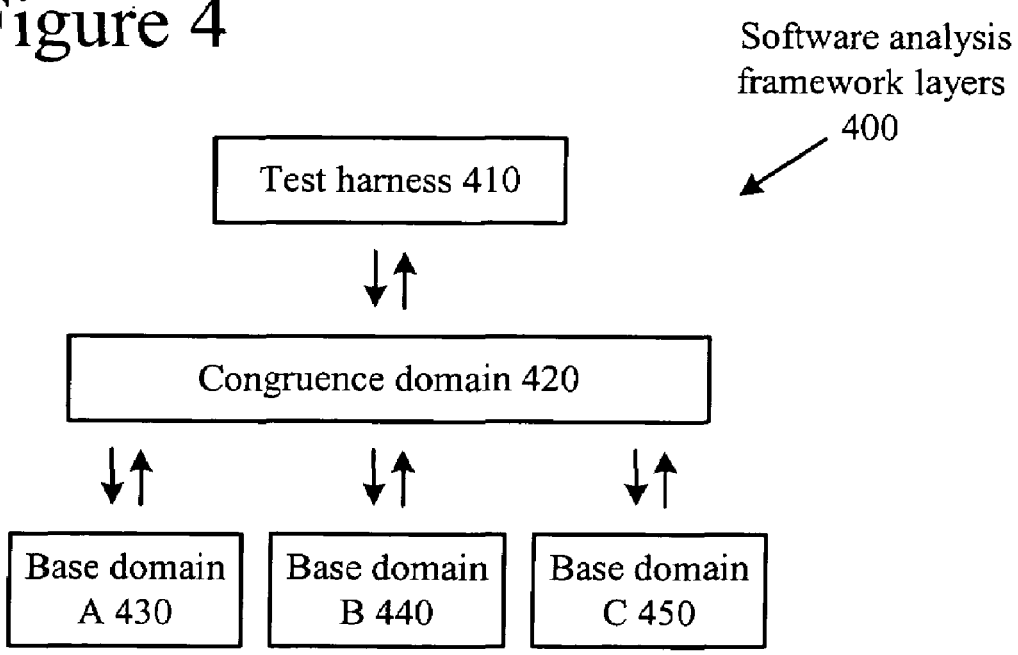
FIG. 4 is a block diagram of layers of software for abstract interpretation with a congruence abstract domain and multiple base domains.

FIG. 4 shows layers (400) of software for abstract interpretation with a congruence abstract domain and multiple base domains. One or more of the layers (400) may be included in a tool such as the tool (300) of FIG. 3. The layers (400) include software for a test harness (410), software for an organizing engine (420) that implements the congruence domain, and software for multiple base domains A, B, and C (430, 440, 450).

In general, the test harness (410) uses standard techniques for an abstract domain harness and is in communication with the organizing engine (420). In particular, for example, the test harness (410) causes the organizing engine (420) to perform various congruence abstract domain operations and receives results from the organizing engine (420). The test harness (410) typically steps through a computer program, causing changes to one or more abstract domains (including the congruence domain and zero or more base domains) as it steps through the computer program.

Among other functions, the organizing engine (420) communicates with the test harness (410) and also communicates with the base domains (430, 440, 450). For example, when the test harness (410) causes the organizing engine (420) to perform certain congruence domain operations, the organizing engine (420) may in turn cause one or more of the base domains (430, 440, 450) to perform base domain operations. The congruence abstract domain is parameterized by the base domains (430, 440, 450).

In some implementations, the congruence domain uses a lattice structure and tracks relations between alien expressions and variables in the base domains (430, 440, 450). An expression may be a program text variable or program function; an alien expression for a base domain is not recognized within that base domain. Intuitively, a base domain variable may act as a placeholder that represents the alien expression and to which the alien expression evaluates. A typical lattice element of the congruence domain is a pair comprising an equivalence graph (which tracks the names given to alien expressions) and a list containing elements from the respective base domains (430, 440, 450).

In addition to mapping alien expressions to base domain variables, an equivalence graph ("e-graph") tracks equalities between terms. For example, the e-graph maps equal expressions to the same value. For a program with client variables x and y as well as a function f( ), an e-graph might map x to the base domain variable $\alpha$, y to the base domain variable $\beta$, f(x) to the base domain variable $\chi$, and f(y) to the base domain variable $\delta$. If at some point x=y in the program, then the base domain variables $\alpha$ and $\beta$ are unified, and the e-graph may map both x and y to $\beta$. By implication since x=y, the e-graph may also map both f(x) and f(y) to $\delta$. This mapping of f(x) and f(y) to $\delta$ is an example of a congruence for this scenario. The congruence domain is able to infer other types of equalities as well (e.g., for symmetric relationships, reflexive relationships, or transitive relationships among expressions, or if expressions evaluate to the same base domain variable).

Each of the base domains (430, 440, 450) supports abstract interpretation for a particular set of functions and relation symbols. There may be some overlap between the different sets of functions and relation symbols supported, or the sets may be disjoint. Base domains often work with variables and constants but support different functions. Each of the base domains (430, 440, 450) can be any type of abstract domain. The base domains (430, 440, 450) in FIG. 4 each support abstract domain operations, for example, constrain, widen, and join. In addition, each of the base domains (430, 440, 450) in FIG. 4 satisfies a few other criteria for interoperation with the congruence domain.

For example, the first base domain (430) might support analysis of constraints involving relations among variables (such as $x \leq y$ and y=z), while the second base domain (440) further supports analysis of constraints involving arrays and functions for returning properties (e.g., length) of arrays. In this case, when a constraint involves an array function such as length(a), the array function is understood by the second base domain (440) but not the first base domain (430), and the organizing module (420) thus creates a base domain variable to represent an expression with the array function within the first base domain (430).

Eventually, the harness (410) associates constraints with various points for the software under test. A tool in the software analysis framework may then find fixed points in the lattice of constraints, querying the various base domains (430, 440, 450) for information. For example, the tool may use Join and Widen operations of the abstract domains. When the lattice of constraints reaches a stable state, the tool may make and present observations and inferences about the software under test.

Although FIG. 4 shows three base domains (430, 440, 450), alternatively, the framework (400) includes more or fewer base domains. For example, the organizing engine (420) may itself operate as an abstract domain without any base domains.

A. Example Operations.

Depending on implementation, the congruence domain and any base domain(s) support various operations. For example, in some implementations, the operations include ToPredicate, Constrain, Join, Widen, Rename, and Eliminate operations. Details for these operations are given below. Alternatively, a congruence domain and/or base domain implements one or more of these operations differently, or the operations include other and/or additional operations.

1. ToPredicate.

Given an element in the lattice for an abstract domain, the operation ToPredicate returns the corresponding constraint. If an element of the congruence domain is an e-graph/base domain element list pair, the ToPredicate operation of the congruence domain in turn calls the ToPredicate operation for the respective base domains with elements in the list. The predicates returned by the base domains will be in terms of base domain variables. The congruence domain replaces the base domain variables with the corresponding alien expressions and conjoins these predicates with a predicate expressing the properties of the e-graph for the congruence domain element.

2. Constrain.

The Constrain operation is used to add a constraint to an element of a lattice for an abstract domain. If an element of the congruence domain is an e-graph/base domain element list pair, the Constrain operation of the congruence domain (if necessary) introduces new expressions and base domain variables in the e-graph for the constraint. The congruence domain then calls the Constrain operation on the respective base domains, passing the constraint (or a modified version of the constraint without alien expressions) to the corresponding lattice elements of the respective base domains. In a modified version of the constraint, expressions alien to a base domain are replaced by a corresponding base domain variable.

In order for the congruence domain to determine which expressions of the constraint to replace with base domain variables for the various base domains, the base domains also implement an Understands operation. The congruence domain calls the Understands operation of a base domain to query what symbols (e.g., function symbols) are understood within the base domain. The Understands operation accepts as parameters a function symbol and expression, which the base domain uses to determine whether it understands the function symbol in the context of the expression. The Understands operation returns a true or false indication to the congruence domain.

To translate a client expression for a computer program into an expression understandable by a base domain, for example, the congruence domain traverses the syntax of the client expression, calling the Understands operation on the base domain for each function symbol. If the base domain understands the function symbol, the congruence domain leaves it as is. Otherwise, the congruence domain replaces the alien sub-expression (involving the function symbol) with a base domain variable and adds the mapping of the alien sub-expression to the base domain variable to the e-graph. After the congruence domain replaces alien sub-expressions with base domain variables for the base domain, the congruence domain calls a Constrain operation for the base domain.

Figure 5:
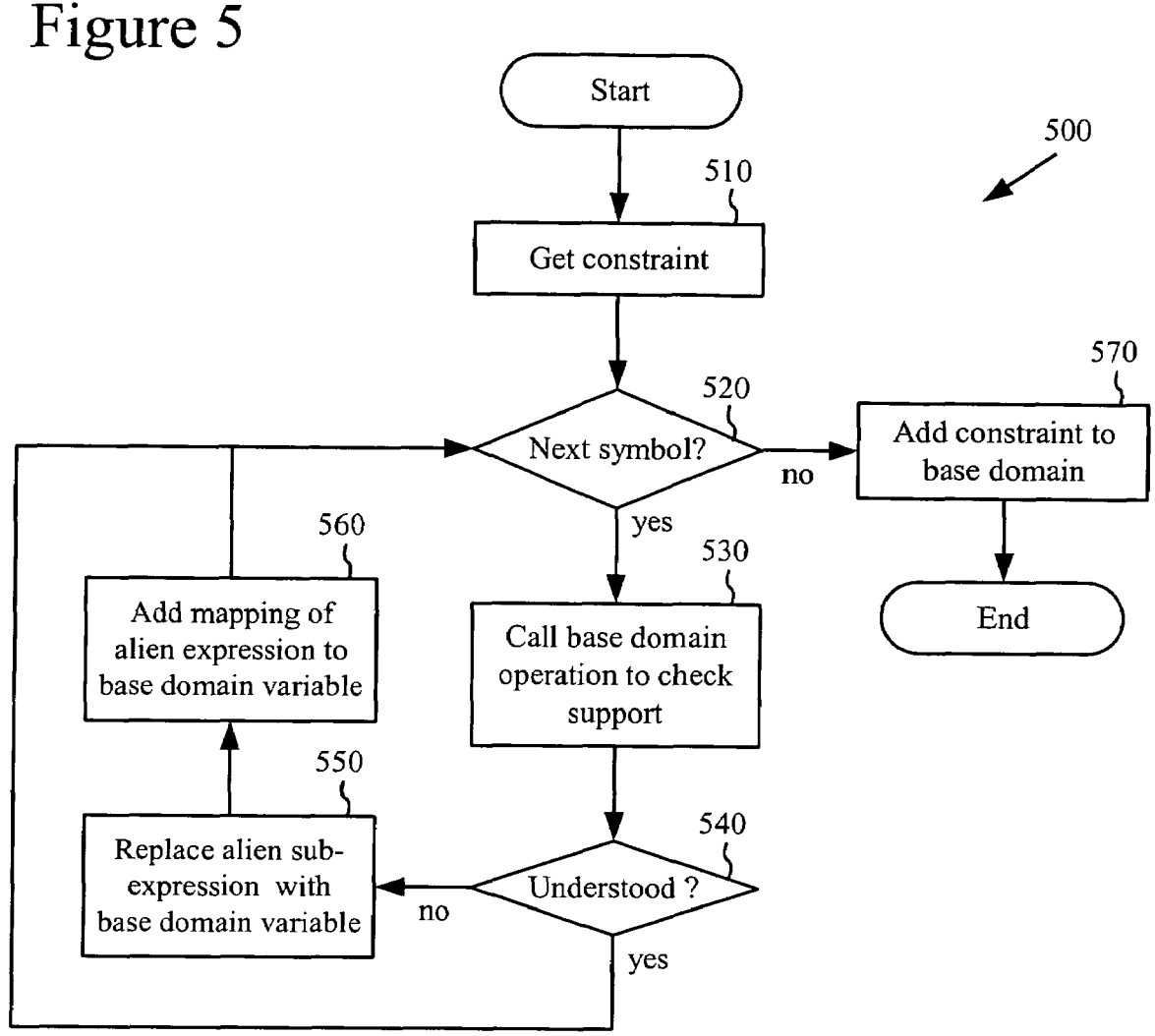
FIG. 5 is a flowchart showing a technique for adding a constraint through the congruence abstract domain.

FIG. 5 shows a technique (500) for adding a constraint with a congruence domain and a single base domain. A tool such as the tool (300) shown in FIG. 3 performs the technique (500) using the Constrain operation or another operation to add the constraint. Alternatively, another tool performs the technique (500).

To start, the tool gets (510) a constraint. For example, a congruence domain for the tool gets a constraint for a computer program from an abstract domain test harness. Alternatively, the tool gets the constraint from another source.

The tool checks (520) whether there are any function symbols in the constraint that should be evaluated by the base domain. The tool may also query the base domain for relation symbols or other symbols in the constraint. As previously noted, in some implementations, variables are understood by all base domains.

For a function symbol of the client expression, the tool calls (530) an operation of the base domain that returns true if the symbol is supported and false otherwise. The tool checks (540) the result. If the symbol is not supported, the tool replaces (550) with a base domain variable one or more alien sub-expressions (involving the unsupported symbol) and tracks (560) the mapping of the alien sub-expression(s) to the base domain variable(s). If the symbol is supported, or after a non-supported symbol is replaced (550) and tracked (560), the tool checks (520) whether there are any more symbols for the base domain to evaluate. If so, the tool calls (530) the support checking operation of the base domain for the new symbol(s). (The new symbols may be for sub-expressions of alien sub-expressions; such sub-expressions may provide useful information for a base domain even though the alien sub-expressions are not understood within the base domain.) Alternatively, the tool tracks over time which symbols are supported by which base domains and selectively skips calls to the support checking operation.

When there are no more symbols for the base domain to evaluate, the tool adds (570) the constraint (which potentially includes base domain variables that replace alien sub-expressions) to the base domain. For example, the tool calls an operation of the base domain to add the constraint. Alternatively, the tool adds the constraint to the base domain through another mechanism.

Although the technique (500) of FIG. 5 shows the addition of a single constraint, the technique (500) may be repeated for an arbitrary number of constraints. Moreover, while FIG. 5 shows a single base domain, the congruence domain may perform the technique (500) concurrently or serially for multiple base domains.

3. Union, Find.

The Union operation merges two equivalence classes by unifying two base domain variables, and then merging other equivalence classes to keep the equivalences congruence closed. The Find operation returns the name (base domain variable) of the equivalence class of a given client expression.

4. Join, Widen.

In general, a join operation is used to join two e-graphs. For example, suppose a computer program includes a chain of nested if-then-else statements. Two constraints that apply after conditional statements may be mutually exclusive, in that one of them holds or the other holds. A test harness may request that such constraints be joined, which causes a join operation on e-graphs in the congruence domain and base domains.

When a join operation is applied successively in a chain of elements, the result may stabilize. In some cases, however, the result does not stabilize. Another operation, the Widen operation, generalizes and the result stabilizes.

5. Rename, Eliminate, Equivalent Expression.

The congruence domain implements a Rename operation to rename client variables. When the Rename operation is invoked, the congruence domain updates its e-graph to map a new client variable to the base domain variable that was mapped to the old client variable. The congruence domain also removes the mapping of the old client variable to the base domain variable. Similarly, the congruence domain implements an Eliminate operation by simply removing the mapping of a given client variable. This means that base domains may have constraints on base domain variables that are no longer representable in terms of client variables. In some implementations, the congruence domain and base domains cooperate to remove such garbage values from the base domains.

Garbage values can be generated by the Eliminate, Join, and Widen operations of the congruence domain. Such garbage values may cause problems for the ToPredicate operation of the congruence domain. Therefore, at certain times, for example, the start of a ToPredicate operation, the congruence domain performs garbage collection. To garbage collect, the congruence domain uses an algorithm that determines which terms and base domain variables are reachable in the e-graph from a client expression. A base domain variable that is not reachable is deemed to be a garbage value. Any client variable is deemed to be reachable, and any function whose arguments are all reachable is deemed to be reachable. In addition, if the client expression side of a mapping is reachable, then the base domain variable side is deemed to be reachable.

There may be terms in an e-graph that depend on some unreachable base domain variables, but whose loss might result in an undesirable loss of information. For example, one argument of a function may be unreachable, while other arguments are reachable. One or more base domains may have information that would allow rewriting of a term so that the term does not use any garbage values. To provide such information, a base domain implements an Equivalent Expression operation. For an expression with a garbage value, the Equivalent Expression operation returns an expression that is equivalent but does not mention the garbage value. In some implementations, a base domain may query other base domains to obtain information useful in returning an equivalent expression.

Figure 6:
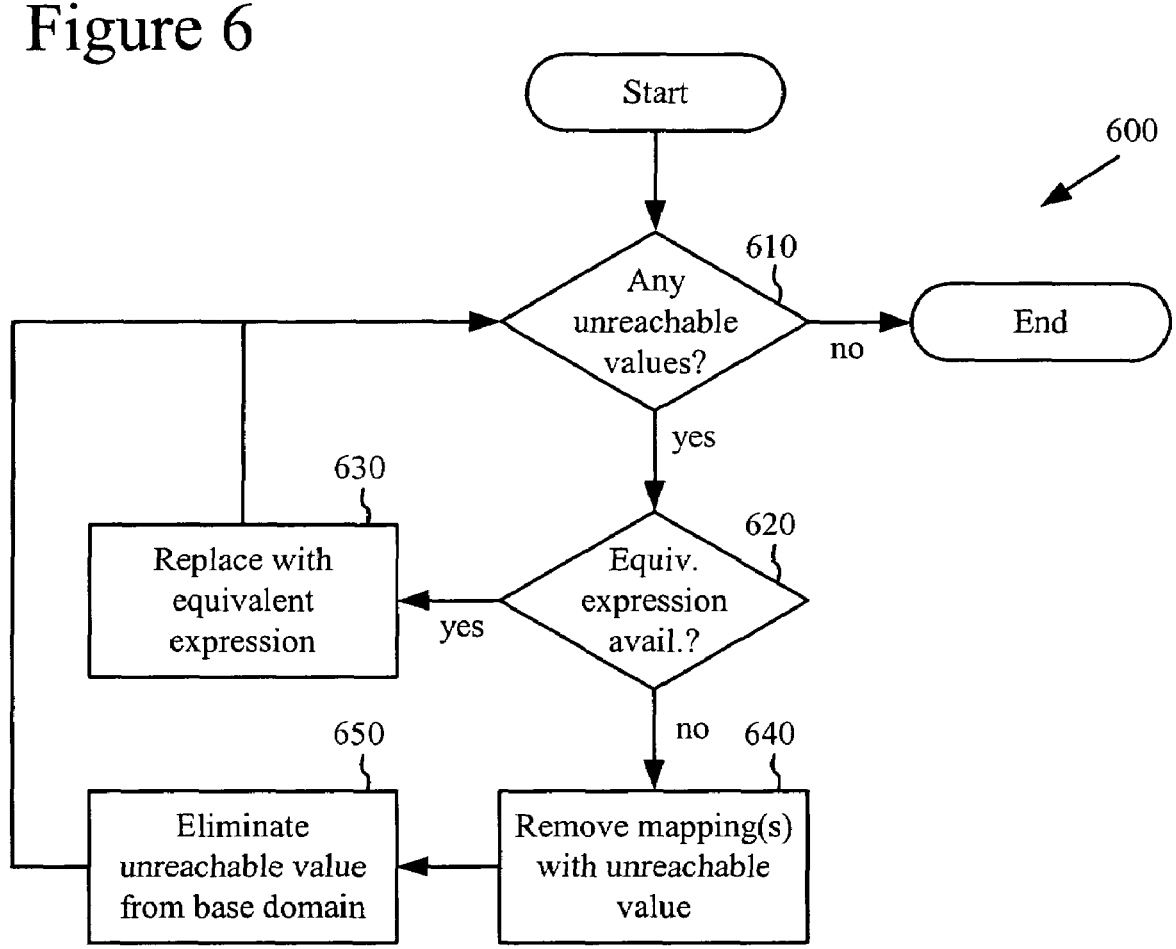
FIG. 6 is a flowchart showing a technique for garbage collection of unreachable values.

FIG. 6 shows a technique (600) for garbage collection of unreachable values. A tool such as the tool (300) shown in FIG. 3 performs the technique (600) using the Equivalent Expression operation or another operation. Alternatively, another tool performs the technique (600).

At some point during analysis, the tool checks (610) for unreachable values in an e-graph. For example, the tool performs this checking before attempting to find the corresponding expression for a given element in the graph. Alternatively, the tool performs this checking at other and/or additional times.

If there are no unreachable values, the technique ends. Otherwise, for an unreachable value in an expression, the tool checks (620) whether an equivalent expression is available which lacks the unreachable value. For example, the tool queries a base domain, providing the expression and the unreachable value, and the tool receives the equivalent expression (if any) in return. Alternatively, the tool uses another mechanism to check whether an equivalent expression is available.

If an equivalent expression is available, the tool replaces (630) the expression that had the unreachable value with the equivalent expression. For example, an expression in an equivalence mapping in the congruence domain is replaced with its equivalent expression. Alternatively, the tool uses another mechanism for replacement with equivalent expressions. The tool then checks (610) for other (possibly new) unreachable values.

On the other hand, if no equivalent expression is available, the tool removes (640) mappings that mention the unreachable value from the e-graph and eliminates (650) the unreachable value from the base domain. Alternatively, the tool uses another mechanism to remove unreachable values from the congruence and base domains. The tool then checks (610) for other (possibly new) unreachable values.

Although the technique (600) of FIG. 6 shows interaction with a single base domain, the congruence domain may perform the technique (600) concurrently or serially for multiple base domains.

B. Code Examples.

A few code examples help illustrate some of these operations and principles.

1. First Code Example.

Suppose a computer program includes the text:

if (b<length(a)) then . . .

An analysis tool may track and evaluate what conditions hold at different points in the computer program. For example, at the point just before the if-then statement, no information is known (constraint is true). If the then statement is reached, the conditional expression for the if-then statement has been satisfied, and a constraint b<length(a) may be added.

When the operations described above are used, the Constrain operation of the congruence domain is called to add the constraint b<length(a), with the harness pushing the constraint to an organizing module. The organizing module calls the Understands operation of any base domains. For example, the organizing module queries a base domain as to whether the base domain supports the "<" operator, then queries the base domain as to whether the base domain supports the length function.

A first base domain might understand the length function while a second base domain does not. In this case, after mapping b to $\beta$ and mapping a to $\alpha$, the constraint $\beta$<length$(\alpha)$ could be added to the first base domain through its Constrain operation. For the second base domain, the organizing module sets up an equivalence class that maps $\chi$ to length$(\alpha)$, then adds the constraint $\beta<\chi$ to the second base domain.

If, at some point later in the program, the length of a increases, the first base domain may assimilate the change in a in the constraint $\beta$<length$(\alpha)$ that was added to the first base domain. Within the second base domain, however, it is no longer the case that the variable $\chi$ is equivalent to length$(\alpha)$, and a new base domain variable is introduced.

2. Second Code Example.

Or, suppose a computer program includes the text:

$b:=a+$'.'.

When the operations described above are used, the Constrain operation of the congruence domain is called to add the constraint b=a+'.', with the harness pushing the constraint to an organizing module. The organizing module calls the Understands operation of any base domains for the congruence domain. For example, the organizing module queries a base domain as to whether the base domain supports the "=" operator, then queries the base domain as to whether the base domain supports the "+" operator (for concatenation for a string of characters).

A first base domain might understand the "+" operator while a second base domain does not. In this case, after mapping b to $\beta$ and mapping a to $\alpha$, the constraint $\beta=\alpha+$'.' could be added to the first base domain through its Constrain operation. For the second base domain, the organizing module sets up an equivalence class that maps $\chi$ to $\alpha+$'.', then adds the constraint $\beta=\chi$ to the second base domain.

Incidentally, if the computer program included the text a:=a+'.', the harness would temporarily rename one of the instances of the variable a. For example, the harness might push the constraint a':=a+'.', then eliminate a and rename a' as a.

IV. Examples of a Heap Succession Abstract Domain

In some embodiments, a tool such as the tool (300) shown in FIG. 3 includes or works in conjunction with a heap succession abstract domain. The heap succession abstract domain tracks updates to a heap.

Many types of computer programs, including object-oriented programs, use heap memory. For some purposes, a heap may be viewed as an array indexed by heap locations. The heap succession techniques and tools described herein may be applied to arrays, records, or other data structures that include a pool of memory locations, and the term heap succession abstract domain applies equally to abstract domains for tracking updates to heaps or other such data structures with pools of memory locations.

Typical heap operations include an operation for reading a field of an object in the heap and an operation for updating a field of an object in the heap. An update operation that assigns an expression e to the field x of an object o may be represented, for example, as o.x:=e or as follows.

$$H:=H', \text{ where } H' \text{ is such that } H \equiv_{o.x} H' \text{ and sel}(H', o, x)=e.$$

The heap succession predicate $H \equiv_{o.x} H'$ indicates H' is an updated heap equivalent to H everywhere except possibly at o.x.

For certain computer programs, update operations may result in the loss of information in abstract domains. For example, in program (d) of FIG. 1, analysis of a field update statement will result in elimination of the prior heap H after the operation, which leads to the loss of information that depends on the prior heap H. This is because no base domain is available to return an equivalent version of H for replacement in the information that depends on the prior heap H. Simply including a heap succession abstract domain as a base domain for a congruence domain remedies this problem. Alternatively, a heap succession abstract domain may be used independently of a congruence domain.

In general, a typical lattice element for a heap succession abstract domain is a conjunction of heap succession predicates.

$$\exists \ldots \cdot H_0 \equiv_{o_0 \cdot x_0} H_1 \wedge H_1 \equiv_{o_1 \cdot x_1} H_2 \wedge \ldots \wedge H_{n-1} \equiv_{o_{n-1} \cdot x_{n-1}} H_n.$$

In some implementations, the heap succession abstract domain works with variables and implements abstract domain operations such as the ones described above. For example, the heap succession abstract domain implements an Equivalent Expression operation to return a heap successor to replace an unreachable heap, which allows substitution of a newer heap variable for an older heap variable in expressions when permissible.

Figure 7:
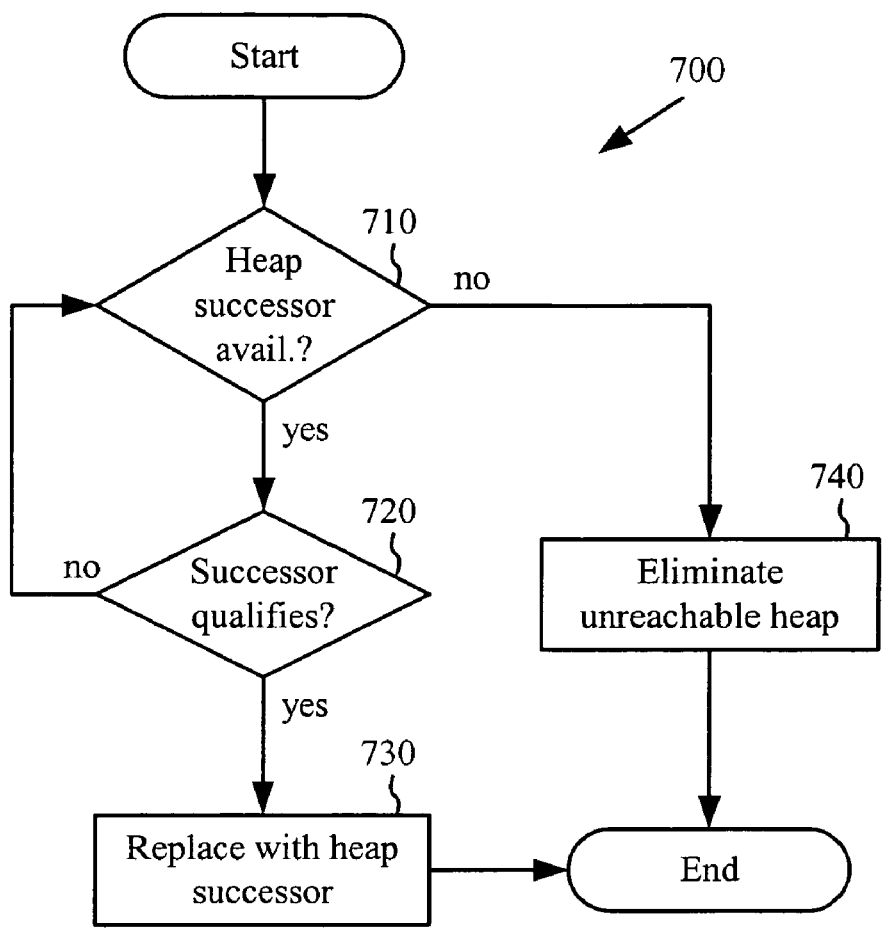
FIG. 7 is a flowchart showing a technique for finding and applying a heap successor using a heap succession abstract domain.

FIG. 7 shows a technique (700) for finding and applying a heap successor using a heap succession abstract domain. A tool such as the tool (300) shown in FIG. 3 performs the technique (700) using an Equivalent Expression operation or other operation to find a heap successor. Alternatively, another tool performs the technique (700).

To start, the tool checks (710) whether a heap successor is available. For example, if a field of an object in a heap has been updated, the tool checks whether there is a heap succession predicate in the heap succession abstract domain for the heap that has been updated. If there is a heap successor, the tool checks (720) whether the heap successor qualifies. For example, the heap successor qualifies if it is equivalent to the heap that has been updated at the field of the object that was updated. Alternatively, the tool uses another mechanism to check for a heap successor or evaluate whether it qualifies.

If the heap successor qualifies, the tool replaces (730) the heap that was updated with the heap successor in expressions. For example, the tool replaces sel(H, o, x) with sel(H', o, x) in various expressions, where H' is the heap successor. Or, the tool substitutes the heap successor for the heap that was updated in some other way.

If the first heap successor does not qualify, the tool checks (710) whether a heap successor to the first heap successor is available. This continues until a qualifying heap successor is found or there are no other heap successors available, in which case the tool eliminates (740) the unreachable heap from the heap succession abstract domain (and potentially other domains such as the congruence domain as well).

A code example helps illustrate some of these operations and principles. Suppose a computer program includes the text:

$$a:=\text{update}(a, 3, 10),$$

where a is an array and update(x, y, z) is an array operation that sets the $y^{th}$ element of the array x to be z. A test harness pushes the constraint a'=update(a, 3, 10) to the congruence domain, then attempts to eliminate a and rename a' to be a. Also suppose that, from previous analysis, the congruence domain tracks various constraints that involve a. In order not to lose too much information when the request to eliminate a is received, the congruence domain queries a heap succession abstract domain for arrays as to whether a in some expression can be replaced with an equivalent expression. Making inferences from information it has tracked, the heap succession abstract domain may be able to return an equivalent expression, where the equivalent uses a' instead of a.

V. Example Combined Implementation and Theoretical Explanations

In this section, an example combined implementation and detailed explanation are provided. Alternatively, another implementation uses one or more of the techniques described above.

In the combined implementation, the abstract interpretation involves analyzing a computer program to infer properties about the program. The properties inferred depend on the abstract domains used in the analysis. Roughly, the properties representable by an abstract domain follow a domain-specific schema of relations among variables. In the combined implementation, a congruence abstract domain in effect extends the properties representable by a given abstract domain to schemas over arbitrary terms, not just variables. Also, the combined implementation uses a heap succession abstract domain that, when used as a base domain for the congruence domain, allows abstract domains to infer properties in the program's heap. This combination of abstract domains has applications, for example, to the analysis of object-oriented programs.

A. Abstract Interpretation in the Combined Implementation.

This section gives the basic interface of each abstract domain in the combined implementation. Various example programs in this section use a simple imperative language to illustrate the use of abstract domain operations to compute over-approximations of reachable states of programs and infer properties about the programs.

In the combined implementation, expressions of interest are variables and functions applied to expressions. Mathematically,

| expressions | Expr | e, p ::= x\|f($\vec{e}$) |
|---|---|---|
| variables | Var | x, y, . . . |
| function symbols | FunSym | f |
| expression sequences | Expr[ ] | $\vec{e}$ ::= $e_0, e_1, \ldots, e_{n-1}$ |

In the various programs and examples in this section, there are deviations from this syntax for the sake of readability. Standard notation is used for constants and operators (e.g., 8 instead of 8( ), and x+y instead of +(x,y)).

FIG. 8 shows the basic abstract domain interface in the combined implementation. Each abstract domain provides a type Elt, representing the elements of the abstract domain lattice. A lattice element corresponds to a constraint on one or more variables. This constraint is returned by the ToPredicate operation. In the combined implementation, a constraint is a boolean-valued expression. Conversely, each constraint p has some most precise representation ToElt(p) in the lattice. (The operation ToElt is not shown in FIG. 8.) Functions corresponding to ToElt and ToPredicate are sometimes labeled α (abstraction) and γ (concretization), respectively.

An abstract domain provides Top and Bottom elements of the lattice. The Top and Bottom elements satisfy the following:

ToPredicate(Bottom)=false,

ToPredicate(Top)=true.

An abstract domain defines a partial ordering on the lattice elements. The AtMost operation compares two elements according to the partial order of the lattice. The lattice order respects the implication order on constraints. That is, if AtMost(A,B), then ToPredicate(A)⇒ToPredicate(B).

Furthermore, an abstract domain defines operations to add a constraint to an element (Constrain), existentially quantify a variable (Eliminate), and rename a free variable (Rename), all of which may be conservative.

Other operations in the combined implementation give different ways of computing new lattice elements. Ideally, for a lattice element A and constraint p, the operation Constrain (A, p) would return ToElt(ToPredicate(A)∧p). Computing this element precisely may demand more computational resources than is worthwhile. Therefore, the Constrain(A, p) operation is allowed to return a lattice element that is higher in the lattice than ToElt(ToPredicate(A)∧p), but not higher than A.

Similarly, the Eliminate(A, x) operation returns a lattice element that is possibly higher than ToElt((∃x•ToPredicate (A))). For a variable y that does not occur free in ToPredicate (A), the operation Rename(A, x, y) returns an element that is possibly higher than ToElt(([y/x] ToPredicate(A)), where the notation [y/x]p denotes p with all free occurrences of x replaced by y.

An abstract domain also defines Join and Widen operations in the combined implementation. The Join(A, B) operation returns a lattice element that is possibly higher than ToElt(ToPredicate(A)∨ ToPredicate(B)). The operation Widen(A, B) returns an element that is possibly even higher, with the additional property that for any ascending sequence of elements $B_0, B_1, B_2, \ldots$ (ascending meaning AtMost($B_0$, $B_1$)∧AtMost($B_1$, $B_2$)∧ . . . ), the ascending sequence:

$C_0 = A$ $C_1 = \text{Widen}(C_0, B_0)$ $C_2 = \text{Widen}(C_1, B_1)$ $\vdots$ stabilizes after a finite number of steps. That is, there is some k such that for all j≦k, $C_j=C_k$. For simplicity, only a single Widen operator is shown, although use of a sequence of gradually coarser Widen operations is possible in the combined implementation.

To illustrate how to apply the abstract domain operations to compute over-approximations of reachable states of programs, example programs in a primitive imperative language are provided. The programs use the following grammar.

| programs | prog ::= b* |
| blocks | b ::= L pred: s |
| labels | L, K |
| predecessors | pred ::= start\|from L* |
| statements | s ::= x:= e\|assume e |

Thus, in the imperative language, a program consists of a number of uniquely labeled blocks. A block contains one statement and a predecessor designation, which is either Start (indicating an entry point of the program) or a set of labels of predecessor blocks. This somewhat unconventional program representation is convenient for forward analysis of programs; control flow between blocks is conveniently represented as a "come-from" relation rather than the more typical "go-to" relation. The guards of conditional control flow are placed in assume statements following a branch, rather than being encoded as part of the branch. For example, using "skip" as a shorthand for assume true, the conventionally written programs (a) and (c) in FIG. 1 can be written as programs (a) and (c) shown in FIG. 9.

A trace of a program is a finite or infinite sequence of blocks $b_0, b_1, b_2, \ldots$ such that $b_0$ is a designated start block, and such that for any consecutive blocks $b_j, b_{j+1}$, the label of $b_j$ is listed in the from set of $b_{j+1}$. A set bb of blocks is a cut point set if every infinite trace of the program contains an infinite number of occurrences of blocks from bb. For any given cut point set bb, a block is a cut point if it is in bb.

A state is a mapping of variables to values. For states σ and τ, the relation Step is defined as follows.

$$\text{Step}(x:=e,\sigma,\tau)=\tau=\sigma[x \mapsto \sigma(e)],$$

$$\text{Step}(\text{assume } p,\sigma,\tau)=\sigma(p)\wedge\sigma=\tau,$$

where σ[x ↦ v] is the mapping that is the same as σ except that x maps to v, and σ(e) denotes the value of e where each of its variables is evaluated according to the mapping σ. An execution of a program is a finite or infinite sequence of states $\sigma_0, \sigma_1, \sigma_2, \ldots$ such that there is a trace $b_0, b_1, b_2, \ldots$ of the same length, and for any consecutive states $\sigma_j,\sigma_{j+1}$, Step($s_j$, $\sigma_j$, $\sigma_{j+1}$, where $s_j$ is the statement in block $b_j$.

Reachable states are computed as follows using abstract interpretation for a given abstract domain in the combined implementation. Each block label L has two associated lattice elements—Pre(L) and Post(L). These are computed, for example, as the least fixpoint equations shown in the pseudocode of FIG. 10. For any block b labeled L, ToPredicate(Pre(L)) is a constraint that holds any time program execution reaches b, and ToPredicate(Post(L)) is a constraint that holds any time execution leaves b. The stability property of the Widen operation guarantees that these lattice elements can be computed in finite time. For example, applying this analysis with the polyhedra domain to program (c) of FIG. 1, a software analysis tool infers, among other things:

ToPredicate(Post(11))=0≦x ∧ x≦N ∧ 0≦y

ToPredicate(Pre(AfterLoop))=0≦x ∧ 0≦y

ToPredicate(Post(AfterLoop))=0≦x ∧ N≦x ∧ 0≦y

The imperative language is extended with statements to update object fields:

$$\text{statements} \quad s \; ::= \; \ldots \mid o.x := e,$$

where the expression o.x refers to the location in the program heap that holds the value of the x field of object o. Then, the concrete semantics of this statement are defined by defining the following case of the Step relation.

$$\text{Step } (o.x:=e,\sigma,\tau) \equiv \tau = \sigma[H \mapsto \tau(H)]$$
$$\wedge \sigma(H) \equiv_{\sigma(o).x} \tau(H) \wedge \text{sel}(\tau(H),\sigma(o),x) = \sigma(e),$$

where Step(s,σ,τ) defines the concrete semantics of statement s with pre-state σ and post-state τ, which are mappings from variables to values. The first conjunct indicates that the maps σ and τ are equal, except possibly in the way they map H; the second conjunct indicates that H does not change, except possibly at o.x; and the third conjunct indicates that, in τ's heap H, o.x has the value e. The element Post for a block L pred: o.x:=e may be computed at:

Post(L)=let H' be a fresh variable,
   A=Constrain(Pre(L), H≡$_{o.x}$H'),
   B=Constrain(A, sel(H', o, x)=e),
   C=Eliminate(B, H),
   D=Rename(C, H', H)
in D end FIG. 11 shows programs (b) and (d) of FIG. 1 in the example imperative language. Using the polyhedra domain as a base domain on program (b) in FIG. 11, a software analysis tool can infer arithmetic properties like:

ToPredicate(Post(2))≡y=sel(H,o,x) ∧ 0≤sel(H,o,x),

ToPredicate(Pre(5))≡0≤y.

With both the polyhedra domain and the heap succession domain as base domains on program (d) in FIG. 11, a software analysis tool can infer properties like:

ToPredicate(Post(AfterLoop))≡0≤o.x ∧ N≤o.x
   ∧ 0≤p.y.

B. Graphical Views of Mappings.

Various mappings described herein can be visualized graphically. For example, FIG. 12 shows an e-graph as a rooted directed graph where the vertices are symbolic values (base domain variables) plus a distinguished root node, and the edges are the terms. Variables and 0-ary functions are labeled edges from the root node to the symbolic value to which they map. The n-ary functions are multi-edges with the (ordered) source nodes being the arguments of the function and the destination node being the symbolic value to which they map labeled with the function symbol.

With reference to FIG. 12, suppose G is the mapping:

$$w \mapsto \alpha \quad x \mapsto \beta \quad f(\beta) \mapsto \alpha \quad y \mapsto \chi \quad g(\beta,\chi) \mapsto \delta \quad f(\chi) \mapsto \delta \quad h(\alpha) \mapsto \alpha.$$

The corresponding graph is:

$$\text{vertices}(G) = \text{range}(G) \cup \{\bullet\},$$

$$\text{edges}(G) = \{\bullet \xrightarrow{x} G(x) \mid x \in \text{domain}(G)\} \cup$$
$$\{\vec{\alpha} \xrightarrow{f} G(f(\vec{\alpha})) \mid f(\vec{\alpha}) \in \text{domain}(G)\}.$$

where • stands for the distinguished root node, as well as the empty sequence.

C. Congruences, Alien Expressions in the Combined Implementation.

In the combined implementation, the congruence abstract domain C is parameterized by a list of base domains $\vec{B}$. A lattice element of the congruence domain is either ⊥ (representing Bottom$_C$) or has the form $\langle G, \vec{B} \rangle$ (here G is an e-graph that keeps track of the names given to alien expressions and $\vec{B}$ is a list containing one non-Bottom$_{B_i}$ lattice element from each base domain B$_i$). The names introduced by the congruence domain to stand for alien expressions appear as variables to the base domains. To distinguish these from the client variables used by the client of the congruence domain, the newly introduced base domain variables are at times herein termed symbolic values. Intuitively, a symbolic value represents the value to which a client expression evaluates. The symbolic value also identifies an equivalence class in the e-graph. In this section, Roman letters indicate client variables and Greek letters indicate symbolic values. An e-graph consists of a set of mappings:

| mappings | Mapping | m ::= t ↦ α, |
|---|---|---|
| terms | Term | t ::= x \| f($\vec{\alpha}$), |
| symbolic values | SymVal | α, β, ... |

In addition to mapping alien expressions to symbolic values, the e-graph keeps track of equalities between terms. The e-graph represents an equality between terms by mapping these terms to the same symbolic value. For example, the constraint w=f(x) ∧ g(x,y)=f(y) ∧ w=h(w) is represented by the following e-graph, which is labeled Ex. 1:

$$w \mapsto \alpha \quad x \mapsto \beta \quad f(\beta) \mapsto \alpha \quad y \mapsto \gamma \quad g(\beta,\gamma) \mapsto \delta \quad f(\gamma) \mapsto \delta \quad h(\alpha) \mapsto \alpha.$$

The e-graph maintains the invariant that the equalities it represents are congruence-closed. That is, if the e-graph represents the terms f(x) and f(y) and the equality x=y, then it also represents the equality f(x)=f(y). For instance, if the e-graph just above is further constrained by x=y, then β and γ are unified, which in turn leads to the unification of α and δ, after which the e-graph becomes:

$$w \mapsto \alpha \quad x \mapsto \beta \quad f(\beta) \mapsto \alpha \quad y \mapsto \beta \quad g(\beta,\beta) \mapsto \alpha \quad h(\alpha) \mapsto \alpha.$$

1. To Predicate

To compute ToPredicate$_C$($\langle G, \vec{B} \rangle$), the congruence domain first obtains a predicate from each base domain B$_i$ by calling ToPredicate$_{B_i}$ (B$_i$). Since the base domains represent constraints among the symbolic values, these predicates will be in terms of symbolic values. The congruence domain then replaces each such symbolic value α with a client expression e, such that recursively mapping the sub-expressions of e to symbolic values yields α. Finally, the congruence domain conjoins these predicates with a predicate expressing the equalities represented by the e-graph. For example, if the congruence domain uses a single base domain B$_0$ for which ToPredicate$_{B_0}$(B$_0$) returns α≦γ, then the congruence domain may compute ToPredicate$_C$ (⟨(Ex. 1), $\vec{B}$⟩) as w=f(x) ∧ g(x,y)=f(y) ∧ w=h(w) ∧ w≦y.

2. Constrain

In the combined implementation, the operation Constrain$_C$ (⟨G,$\vec{B}$⟩,p) may introduce new symbolic values and constraints in G, and then calls Constrain$_{B_i}$(B$_i$,p$_i$) on each base domain B$_i$, where p$_i$ is p with expressions alien to B$_i$ replaced by the corresponding symbolic value. If any Constrain$_{B_i}$ operation returns Bottom$_{B_i}$, then Constrain$_C$ returns ⊥. Additionally, if the constraint p is an equality, then the congruence domain notes that in the e-graph by calling Union.

In order for the congruence domain to know which sub-expressions of p to replace by symbolic values, the interface of base abstract domains is extended with the following operation:

Understands: FunSym×Expr[ ]→bool, which indicates whether the abstract domain understands the given function symbol in the given context (i.e., the arguments to the function in question). An abstract domain may choose to indicate it understands a function symbol even when it only partially interprets it.

To translate the client expression to an expression understandable to a base domain, the congruence domain traverses top-down the abstract syntax tree of the client expression, calling Understands on the base domain for each function symbol. If the base domain understands the function symbol, then the congruence domain leaves it as is. If not, then the congruence domain replaces the alien sub-expression with a symbolic value and adds this mapping to the e-graph. Hopeful that it will help in the development of good reduction strategies, the congruence domain may continue to call Understand on sub-expressions of alien expressions and assert equalities with the symbolic value for any sub-expression that is understood by the base domain. In fact, this is done when a new client expression is introduced into the e-graph as part of the Find operation.

To illustrate the Constrain$_C$ operation, suppose the congruence domain is given the following constraint:

Constrain$_C$(⟨G,$\vec{B}$⟩, 2·x+sel(H,o,f)≦|y−z|).

If a base domain B$_i$ is the polyhedra domain, which understands linear arithmetic (+, −, ·, 2, ≦ in this example), then the congruence domain makes the following calls on the polyhedra domain B$_i$:

Constrain$_{B_i}$(Constrain$_{B_i}$(B$_i$, γ=υ−ζ), 2·χ+α≦β), and the e-graph is updated to contain the following mappings:

| x ↦ χ | H ↦ σ | sel(σ, ω, φ) ↦ α |
| y ↦ υ | o ↦ ω | \|γ\| ↦ β |
| z ↦ ζ | f ↦ φ | υ − ζ ↦ γ |

As for the Union and Find operations on the e-graph. The Union operation merges two equivalence classes. It does so by unifying two symbolic values and then merging other equivalence classes to keep the equivalences congruence-closed. Unlike the standard union operation, but akin to the union operation in the Nelson-Oppen congruence closure algorithm that combines decision procedures in a theorem prover, doing the unification involves updating the base domains.

The Find operation returns the name of the equivalence class of a given client expression, that is, its symbolic value. If the e-graph does not already represent the given expression, the Find operation has a side effect of adding the representation to the e-graph. Like Union, this operation differs from the standard Find operation in that it involves updating the base domains. To avoid loss of information by the congruence domain, additional equality constraints between understandable sub-expressions and their symbolic values (like γ=υ−ζ in the example above) are given to the base domains.

FIGS. 13A-13C show detailed pseudocode for Constrain$_C$ as well as the Union and Find congruence domain operations in the combined implementation. Some operations update the e-graph or base domain elements as a side effect. To make the possibility of side effects explicit, the pseudocode shows such formal parameters as in-out parameters, as well as indicating the corresponding actual parameters at call sites with the in-out keyword.

3. Rename, Eliminate

In the combined implementation, since the base domains never see client variables, the congruence domain can implement Rename$_C$ without needing to call the base domains. The congruence domain need only update its e-graph to map the new variable to the symbolic value mapped by the old variable (and remove the mapping of the old variable).

Similar to Rename$_C$, in the combined implementation Eliminate$_C$ is implemented by simply removing the mapping of the given variable (without calling the base domains). This means that base domains may have constraints on symbolic values that are no longer representable in terms of client variables. Elimination of such garbage values from the base domains is postponed until necessary in the combined implementation.

FIG. 13C also shows pseudocode for Rename$_C$ and Eliminate$_C$ in the combined implementation.

4. Cleaning Up Garbage Values

In the combined implementation, garbage values—symbolic values that do not map to any client expressions—can be generated by Eliminate$_C$, Join$_C$, and Widen$_C$, and garbage values would be a problem for ToPredicate$_C$. Therefore, at strategic times, including at the start of a ToPredicate$_C$ operation, the congruence domain performs garbage collection. Roughly, an Eliminate operation with garbage collection is a lazy quantifier elimination operation.

To garbage collect in the combined implementation, a "mark-and-sweep" algorithm is used that determines which terms and symbolic values are reachable in the e-graph from a client expression. A symbolic value that is not reachable is a garbage value. The term "reachable (from a client expression)" means the smallest relation such that: (a) any client variable is reachable, (b) any function application term whose arguments are all reachable is reachable, and (c) if the left-hand side of a mapping in the e-graph is reachable, then so is the right-hand side of the mapping.

There may be terms in an e-graph that depend on unreachable symbolic values (i.e., that take unreachable symbolic values as arguments). Dropping these may lead to an undesirable loss of information, but the base domains may have additional information that would allow rewriting of the terms to not use garbage values. To harvest such additional information, the abstract domain interface is extended with the following operation:

EquivalentExpr: Elt×Queryable×Expr×Var→Expr option, where the operation EquivalentExpr(B,Q,t,α) returns an expression that is equivalent to t but does not mention α (if possible). The Queryable parameter Q provides the base domain an interface to broadcast queries to other abstract domains about certain predicates, which it might need to yield an equivalent expression.

After marking, the garbage collector picks a candidate garbage value (say α), if any. Then, for every mapping t ↦ β where t mentions α, each base domain is asked for an equivalent expression for t that does not mention α; if one is obtained, then the t in the mapping is replaced by the equivalent expression. The marking algorithm is then resumed there, in case an equivalent expression may have given rise to more unreachable terms and symbolic values. After that, if α is still unreachable, all remaining mappings that mention α are removed from the e-graph and Eliminate$_{B_i}$(B$_i$,α) is called on every base domain B$_i$. At this time, α has either been determined to be reachable after all, or it has been eliminated completely from the e-graph and all base domains. The garbage collector then repeats this process for the next candidate garbage value, if any.

5. Congruence-Closure Lattice

In the combined implementation, the congruence domain C may be viewed mathematically as the Cartesian product lattice over an equivalences lattice E and the base domain lattices, where the equivalences lattice E is the lattice over (empty, finite, and infinite) conjunctions of equality constraints between expressions ordered by logical implication. Both E and C are lattices, assuming the base domain lattices are lattices. As with other standard e-graph data structures, however, the e-graphs described above represent only an empty or finite conjunction of ground equalities plus implied congruences, that is, only a proper subset of E. To define the set of equalities implied by an e-graph in the combined implementation, the evaluation judgment G⊢e⇓α is defined, which signifies that the e-graph G evaluates the client expression e to the symbolic value α:

$$\boxed{G \vdash e \Downarrow \alpha}$$

$$\frac{G(x) = \alpha}{G \vdash x \Downarrow \alpha} var \qquad \frac{G \vdash e_0 \Downarrow \alpha_0 \ldots G \vdash e_{n-1} \Downarrow \alpha_{n-1} \ G(f(\alpha_0, \alpha_1, \ldots, \alpha_{n-1})) = \alpha}{G \vdash f(e_0, e_1, \ldots, e_{n-1}) \Downarrow \alpha} fun$$

This corresponds to intuition that an expression belongs to the equivalence class of expressions labeled by the symbolic value to which it evaluates. The equalities implied by an e-graph are defined by introducing the following judgment:

$$\boxed{G \mid \vdash e_0 = e_1}$$

$$\frac{G \vdash e_0 \Downarrow \alpha \ \ G \vdash e_1 \Downarrow \alpha}{G \mid \vdash e_0 = e_1} eval$$

$$\frac{G \mid \vdash e_0 = e_1}{G \mid \vdash f(e_0) = f(e_1)} cong$$

$$\frac{}{G \mid \vdash e = e} refl$$

$$\frac{G \mid \vdash e_1 = e_0}{G \mid \vdash e_0 = e_1} symm$$

$$\frac{G \mid \vdash e_0 = e_1 \ G \mid \vdash e_1 = e_0}{G \mid \vdash e_0 = e_2} trans$$

An equality is implied by the e-graph if (a) both sides evaluate to the same symbolic value, (b) it is a congruence implied by the e-graph, (c) or it is implied by the axioms of equality.

𝒢 denotes the poset of e-graphs ordered with the partial order from E (i.e., logical implication). The operations described above have the property that, given an element representable by an e-graph, the resulting element can be represented by an e-graph. Join 𝒢 cannot have this property, however, as is demonstrated by the following example (Ex. 2):

$$(x = y) \sqcup_\varepsilon (g(x) = g(y) \wedge x = f(x) \wedge y = f(y)) = \bigwedge_{i:i\geq 0} g(f^i(x)) = g(f^i(y)),$$

where ⊔$_E$ indicates the join in the lattice E, and f$^i$ (x) indicates i applications of f. This example shows that 𝒢 is not a lattice, since for any k, $\wedge_{i:0 \leq i \leq k} g(f^i(x)) = g(f^i(y))$ can be represented by an e-graph, but not the infinite conjunction. Thus, Join$_C$ may have to conservatively return an e-graph that is less precise (i.e., higher) than the join in E.

Aside from the trivial cases where one or both of the inputs are Top or Bottom, AtMost$_C$ (⟨G$_0$, $\vec{B}_0$⟩, ⟨G$_1$, $\vec{B}_1$⟩) holds if and only if G$_1$ ⊩e$_0$=e$_1$ implies G$_0$ ⊩e$_0$=e$_1$ for all e$_0$,e$_1$ and AtMost$_{\vec{B}}$($\vec{B}_0$, $\vec{B}_1$). For the e-graphs, whether all equalities implied by G$_1$ are implied by G$_0$ is determined in the combined implementation by considering all ground equalities in G$_1$ (given by two mappings to the same symbolic value) and seeing if a Find on both sides in G$_0$ yield the same symbolic value (since the e-graph is congruence-closed).

6. Join

FIG. 14 shows pseudocode for the Join operation for the congruence domain in the combined implementation. Specifically, FIG. 14 shows as algorithm that computes a join of e-graphs, introduces the new symbolic values in the base domains, and then computes Join$_C$ as the Cartesian product of the various joins. As a new symbolic value is created in the result e-graph, the corresponding pair of symbolic values in the input graphs is tracked. This is given by two partial mappings M$_0$ and M$_1$ that map symbolic values in the resulting e-graph to symbolic values in G$_0$ and G$_1$, respectively. Visited$_0$ and Visited$_1$ track the symbolic values that have already been considered in G$_0$ and G$_1$, respectively.

The workset W gets initialized to the variables and 0-ary functions that are in common between the input graphs (along with where they map in the input graphs) (line 5). Conceptually, the workset contains terms (i.e., edges) that will be in the resulting e-graph but do not yet have a symbolic value to map to (i.e., a destination node). Then, until the workset is empty, some term is chosen to determine what symbolic value it should map to in the resulting e-graph. For a $\langle t,\alpha_0,\alpha_1\rangle \in W$, if the pair $\langle\alpha_0,\alpha_1\rangle$ is one where a symbolic value $\gamma$ is already assigned in the resulting e-graph G, then t is mapped to $\gamma$ in G (line 9). Otherwise, the pair is a new pair, and the algorithm creates a new symbolic value (i.e., node) $\rho$ in G, updates $M_0$ and $M_1$ accordingly, considers $\alpha_0$ and $\alpha_1$ visited, and maps t to $\rho$ in G (lines 11-15). So that information is not lost unnecessarily (unless chosen to by the base domains), equalities are asserted between the symbolic values in the input graphs with the corresponding symbolic values in the result graph (line 12) before taking the join of the base domains. Finally, the algorithm finds each function in common between $G_0$ and $G_1$ from $\alpha_0$ and $\alpha_1$, respectively, where all arguments have now been visited ($\alpha_0$ and $\alpha_1$ being the last ones). Each such function is added to the workset but with the arguments being in terms of the symbolic values of the resulting e-graph (line 16).

A few small optimizations are possible when creating a new symbolic value in the result graph. First, if there is a global invariant that symbolic values are never reused, then $\alpha$ can be used for the symbolic value in the resulting e-graph corresponding to the pair $\langle\alpha,\alpha\rangle$ in the input graphs (rather than getting a fresh symbolic value). Second, for the first symbolic value $\rho$ in the resulting e-graph that maps to $\alpha_0$ in the input graph $G_0$, rather than calling $\text{Constrain}_{\vec{B}}(\vec{B'}_0,\alpha_0=\rho)$, $\text{Rename}_{\vec{B}}(\vec{B'}_0,\alpha_0,\rho)$ may be called since $\alpha_0$ will not be a symbolic value in the result e-graph (and similarly for $G_1$).

1. Soundness of the Join Algorithm

The above join algorithm for the combined implementation gives an upper bound. Since $\text{Constrain}_{\vec{B}}$ operation calls simply give multiple names to existing variables, the soundness of $\text{Join}_C$ reduces to soundness of the join of the e-graphs (assuming the joins of the base domains are sound). Join $\mathcal{G}$ indicates the algorithm described in FIG. 14 ignoring the base domains. Informally, Join $\mathcal{G}$ is sound if for any equality implied by the resulting e-graph, it is implied by both input e-graphs.

Theorem 1 (Soundness of Join $\mathcal{G}$):

Let G=Join $\mathcal{G}(G_0,G_1)$. If $G \Vdash e_0=e_1$, then $G_0 \Vdash e_0=e_1$ and $G_1 \Vdash e_0=e_1$.

Different e-graphs can represent the same lattice element. For example, consider the following e-graphs:

| | | | |
|---|---|---|---|
| $x \mapsto \alpha$ | $y \mapsto \alpha$ | | (Ex. 3a), |
| $x \mapsto \alpha$ | $y \mapsto \alpha$ | $f(\alpha) \mapsto \beta$ | (Ex. 3b), | which both represent the constraint x=y (and any implied congruences). For previous examples, the element that is represented by the result was the same regardless of the form of the e-graph in the input; however, the precision of the join algorithm is actually sensitive to the particular e-graph given as input. For example, the join of the e-graphs shown in Ex. 3a and Ex. 3b, respectively, with an e-graph representing the constraint f(x)=f(y) yields elements true and f(x)=f(y) as shown below:

$$\text{Join } \mathcal{G}(\{x \mapsto \alpha, y \mapsto \alpha\}, \{x \mapsto \gamma, y \mapsto \delta, f(\gamma) \mapsto E, f(\delta) \mapsto E\}) = \{x \mapsto \rho, y \mapsto \sigma\}$$

$$\text{Join } \mathcal{G}(\{x \mapsto \alpha, y \mapsto \alpha, f(\alpha) \mapsto \beta\}, \{x \mapsto \gamma, y \mapsto \delta, f(\gamma) \mapsto E, f(\delta) \mapsto E\}) = \{x \mapsto \rho, y \mapsto \sigma, f(\rho) \mapsto \tau, f(\sigma) \mapsto \tau\}$$

A naïve idea might be to extend the e-graph in Ex. 3a to the e-graph in Ex. 3b in the join algorithm as necessary. The algorithm no longer terminates, however, if the join in the lattice E is not representable as a finite conjunction of equality constraints plus their implied congruences. (Ex. 2 shows that such a non-representable join is possible.)

More formally, let G=Join $\mathcal{G}(G_0,G_1)$. Let W be the workset and $M_0$, $M_1$ be the mappings defined in the join algorithm. To simplify the notation, let $\llcorner \_ \lrcorner_0$ and $\llcorner \_ \lrcorner_1$ denote $M_0$ and $M_1$, respectively. Furthermore, let $\ulcorner \_ \urcorner$ be an inverse mapping of $M_0$ and $M_1$ defined in the following manner:

$\ulcorner \alpha_0,\alpha_1 \urcorner = \gamma$ if $M_0^{-1}(\alpha_0) \cap M_1^{-1}(\alpha_1)=\{\gamma\}$.

Lemma I: The following facts are invariants of the algorithm.

a. If $\langle x,\alpha_0,\alpha_1\rangle \in W$, then $G_0(x)=\alpha_0$ and $G_1(x)=\alpha_1$.

b. If $\langle f \ulcorner \vec{\beta} \urcorner, \alpha_0,\alpha_1\rangle \in W$, then $G_0(f(\llcorner \vec{\beta} \lrcorner_0))=\alpha_0$ and $G_1(f(\llcorner \vec{\beta} \lrcorner_1))=\alpha_1$.

c. If $G(x)=\gamma$, then $G_0(x)=\llcorner \gamma \lrcorner_0$ and $G_1(x)=\llcorner \gamma \lrcorner_1$.

d. If $G(f(\vec{\beta}))=\gamma$, then $G_0(f(\llcorner \vec{\beta} \lrcorner_0))=\llcorner \gamma \lrcorner_0$ and $G_1(f(\llcorner \vec{\beta} \lrcorner_1))=\llcorner \gamma \lrcorner_1$.

Proof: For (a) and (b), items are only added into the workset on lines 5 and 16 and only when they satisfy these properties. For (c) and (d), G is initially empty, so the statements are vacuously true then. G is modified only on lines 9 and 14. In the first case, the guard on the conditional along with (a) and (b) ensure the desired result. In the second case, the line above that updates $\llcorner \_ \lrcorner_0$ and $\llcorner \_ \lrcorner_1$ so that these properties hold (along with the invariant on the workset given by (a) and (b)).

Lemma II: If $G \vdash e \Downarrow \gamma$, then $G_0 \vdash e \Downarrow \llcorner \gamma \lrcorner_0$ and $G_1 \vdash e \Downarrow \llcorner \gamma \lrcorner_1$.

Proof (by induction on the structure of $\mathcal{D}$): $G \vdash e \Downarrow \gamma$.

Case 1(var): $\mathcal{D} = \dfrac{G(x)=\gamma}{G \vdash x \Downarrow \gamma}$ var.

By Lemma I(c), $G_0(x)=\llcorner \gamma \lrcorner_0$ and $G_1(x)=\llcorner \gamma \lrcorner_1$. Then by var, $G_0 \vdash x \Downarrow \llcorner \gamma \lrcorner_0$ and $G_1 \vdash x \Downarrow \llcorner \gamma \lrcorner_1$, as required.

Case 2(fun): $\mathcal{D} =$ $$\dfrac{G \vdash e_0 \Downarrow \beta_0 \ldots G \vdash e_{n-1} \Downarrow \beta_{n-1}\ G(f(\beta_0,\beta_1,\ldots,\beta_{n-1}))=\gamma}{G \vdash f(e_0,e_1,\ldots,e_{n-1}) \Downarrow \gamma} \text{fun.}$$

By the induction hypothesis, $G_0 \vdash e_0 \Downarrow \llcorner \beta_0 \lrcorner_0, \ldots, G_0 \vdash e_{n-1} \Downarrow \llcorner \beta_{n-1} \lrcorner_0$ and $G_1 \vdash e_0 \Downarrow \llcorner \beta_0 \lrcorner_1, \ldots, G_1 \vdash e_{n-1} \Downarrow \llcorner \beta_{n-1} \lrcorner_1$. By Lemma I(d), $G_0(f(\llcorner \vec{\beta} \lrcorner_0))=\llcorner \gamma \lrcorner_0$ and $G_1(f(\llcorner \vec{\beta} \lrcorner_1))=\llcorner \gamma \lrcorner_1$, so $G_0 \vdash f(\vec{e}) \Downarrow \llcorner \gamma \lrcorner_0$ and $G_1 \vdash f(\vec{e}) \Downarrow \llcorner \gamma \lrcorner_1$ by applying fun, as required.

Theorem 1 (Soundness of Join $\mathcal{G}$): If $G \Vdash e_0=e_1$, then $G_0 \Vdash e_0=e_1$ and $G_1 \Vdash e_0=e_1$.

Proof (by induction on the structure of $\mathcal{D}$): $G \Vdash e_0 = e_1$.

$$\text{Case 1}(eval): \mathcal{D} = \frac{G \vdash e_0^{\mathcal{D}_0} \Downarrow \alpha \quad G \vdash e_1^{\mathcal{D}_1} \Downarrow \alpha}{G \mid \vdash e_0 = e_1} eval.$$

By Lemma II on $\mathcal{D}_0$ and $\mathcal{D}_1$, $G_0 \vdash e_0 \Downarrow \vdash \alpha \dashv_0$ and $G_0 \vdash e_1 \Downarrow \vdash \alpha \dashv_0$, as well as $G_1 \vdash e_0 \Downarrow \vdash \alpha \dashv_1$ and $G_1 \vdash e_1 \Downarrow \vdash \alpha \dashv_1$. Thus, by applications of rule Eval, $G_0 \Vdash e_0 = e_1$ and $G_1 \Vdash e_0 = e_1$ as required.

Case 2 (cong, refl, symm, and trans): These cases follow by a straightforward application of the induction hypothesis followed by the rule or directly by the rule (in the case of refl).

2. Completeness of the Join Algorithm

Ex. 2 does suggest that Join $\mathcal{G}$ can be made arbitrarily precise though not absolutely precise. In fact, the precision is controlled exactly by what terms are represented in the e-graph. If an equality is represented in both input e-graphs to Join $\mathcal{G}$, then that equality will be implied by the result e-graph. In fact, the equality will also be represented in the result e-graph. Thus, the precision of the join operation can be controlled by the client introducing expressions the client values in the initial e-graph.

Theorem 2 (Relative Completeness of Join $\mathcal{G}$): Let G=Join $_\mathcal{G}(G_0, G_1)$.
If $G_0 \vdash e_0 \Downarrow \alpha_0$, $G_0 \vdash e_1 \Downarrow \alpha_0$, $G_1 \vdash e_0 \Downarrow \alpha_1$, and $G_1 \vdash e_1 \Downarrow \alpha_1$, then $G \Vdash e_0 = e_1$.

This theorem, however, does not directly indicate anything about the precision of the entire join Join$_C$. While without calls to Constrain$_{\vec{B}}$, much information would be lost, it is not clear if as much as possible is preserved. A challenge for obtaining precise combinations of join algorithms is as follows. Let $$E_0 \stackrel{def}{=} a = a' \wedge b = b' \text{ and } E_1 \stackrel{def}{=} a = b' \wedge b = a', \text{then}$$

$$E_0 \sqcup_\varepsilon E_1 \equiv true$$

$$E_0 \sqcup_\mathcal{P} E_1 \equiv a + b = a' + b'$$

$$E_0 \sqcup_{\varepsilon,\mathcal{P}} E_1 \sqsubseteq_{\varepsilon,\mathcal{P}} \bigwedge_{i: i \geq 0} f^i(a) + f^i(b) = f^i(a') + f^i(b')$$

where P is the polyhedra abstract domain and E,P is a hypothetical combination of equalities of uninterpreted functions and linear arithmetic. The combined join also yields an infinite conjunction of equalities not representable by the e-graphs herein. Thus, absolute completeness is not achieved using the congruence-closure domain with the polyhedra domain as a base domain. An analogous relative completeness is achieved, however, where all conjuncts are obtained where the terms are represented in the input e-graphs. In the table below, the e-graphs for $E_0$ and $E_1$ are shown with one application of f to each variable explicitly represented and to the join of these e-graphs. Consider the input elements for the polyhedra domain to be Top$_P$. The elements after the calls to Constrain$_P$ during Join$_C$ and the final result after the polyhedra join are shown.

|  | $C_0$ |  | $C_1$ |  | Join$_C(C_0, C_1)$ |  |
|---|---|---|---|---|---|---|
| E-Graph | $a \mapsto \alpha_0$ | $b \mapsto \beta_0$ | $a \mapsto \alpha_1$ | $b \mapsto \beta_1$ | $a \mapsto \rho$ | $b \mapsto \tau$ |
|  | $a' \mapsto \alpha_0$ | $b' \mapsto \beta_0$ | $b' \mapsto \alpha_1$ | $a' \mapsto \beta_1$ | $a' \mapsto \sigma$ | $b' \mapsto \upsilon$ |
|  | $f(\alpha_0) \mapsto \gamma_0$ | $f(\beta_0) \mapsto \delta_0$ | $f(\alpha_1) \mapsto \gamma_1$ | $f(\beta_1) \mapsto \delta_1$ | $f(\rho) \mapsto \phi$ | $f(\tau) \mapsto \psi$ |
|  |  |  |  |  | $f(\sigma) \mapsto \chi$ | $f(\upsilon) \mapsto \omega$ |

Polyhedra $\alpha_0 = \rho = \sigma$ $\beta_0 = \tau = \upsilon$ $\alpha_1 = \rho = \upsilon$ $\beta_1 = \tau = \sigma$ $\rho + \tau = \sigma + \upsilon$
(after Constrains) $\gamma_0 = \phi = \chi$ $\delta_0 = \psi = \omega$ $\gamma_1 = \phi = \omega$ $\delta_1 = \psi = \chi$
$\phi + \psi = \chi + \omega$ ToPredicate$_C$ on the result yields $a + b = a' + b' \wedge f(a) + f(b) = f(a') + f(b')$, as desired. Note that there are no equality constraints in the resulting e-graph; these equalities are only reflected in the base domain. This example suggests that such equalities inferred by a base domain should be propagated back to the e-graph in case those terms exist in the e-graph for another base domain where such a term is alien.

More formally, let Visited$_0$ and Visited$_1$ be the sets defined in the join algorithm upon termination that track the symbolic values that have been considered in $G_0$ and $G_1$, respectively.

Lemma III: If $G_0 \vdash e \Downarrow \alpha_0$ and $G_1 \vdash e \Downarrow \alpha_1$, then a. $\alpha_0 \in$ Visited$_0$ and $\alpha_1 \in$ Visited$_1$; and b. $G \vdash e \Downarrow \ulcorner \alpha_0, \alpha_1 \urcorner$.

Proof (by induction on the structure of e): Let $\mathcal{D}_0$ denote the derivation of $G \vdash e \Downarrow \alpha_0$ and $\mathcal{D}_1$ denote $G_1 \vdash e \Downarrow \alpha_1$.

Case 1 (var):

$$\mathcal{D}_0 = \frac{G_0(x) = \alpha_0}{G_0 \vdash x \Downarrow \alpha_0} var$$

$$\mathcal{D}_1 = \frac{G_1(x) = \alpha_1}{G_1 \vdash x \Downarrow \alpha_1} var.$$

A pair of symbolic values $\alpha_0$ and $\alpha_1$ are added to Visited$_0$ and Visited$_1$, respectively, exactly when the first $\langle t, \alpha_0, \alpha_1 \rangle$ (for some t) is drawn from the workset (line 15). Thus, it suffices to show that some $\langle t, \alpha_0, \alpha_1 \rangle$ is added to the workset. From $\mathcal{D}_0$ and $\mathcal{D}_1$, x 0 domain($G_0$) and x 0 domain($G_1$), so $\langle x, \alpha_0, \alpha_1 \rangle$ must get added to the workset W in line 5.

When $\langle x, \alpha_0, \alpha_1 \rangle$ is drawn from the workset, G is modified to give a mapping for x on lines 9 on 14. On line 9, the guard ensures that $G(x) = \ulcorner \alpha_0, \alpha_1 \urcorner$, while on line 14, the previous line updates ∟┘and ∟┘so that $G(x) = \ulcorner \alpha_0, \alpha_1 \urcorner$. Then by rule var, $G \vdash x \Downarrow \ulcorner \alpha_0, \alpha_1 \urcorner$.

Case 2 (fun):

$$\mathcal{D}_0 = \frac{G_0 \vdash e_0 \Downarrow \delta_0 \cdots G_0 \vdash e_{n-1} \Downarrow \delta_{n-1} G_0(f(\delta_0, \delta_1, \ldots, \delta_{n-1})) = \alpha_0}{G_0 \vdash f(e_0, e_1, \ldots, e_{n-1}) \Downarrow \alpha_0} \text{ fun, and}$$

$$\mathcal{D}_1 = \frac{G_1 \vdash e_0 \Downarrow \varepsilon_0 \cdots G_1 \vdash e_{n-1} \Downarrow \varepsilon_{n-1} \quad G_1(f(\varepsilon_0, \varepsilon_1, \ldots, \varepsilon_{n-1})) = \alpha_1}{G_1 \vdash f(e_0, e_1, \ldots, e_{n-1}) \Downarrow \alpha_1} \text{ fun.}$$

Following reasoning in the previous case, it suffices to show that $\langle f(\ulcorner \vec{\delta}, \vec{\epsilon} \urcorner), \alpha_0, \alpha_1 \rangle$ gets added to the workset W. By the induction hypothesis, $\delta_0, \delta_1, \ldots, \delta_{n-1} \in \text{Visited}_0$ and $\epsilon_0, \epsilon_1, \ldots, \epsilon_{n-1} \in \text{Visited}_1$. Consider the iteration where the last pair $\delta_i$ and $\in_j$ gets added to Visited$_0$ and Visited$_1$ and observe that $\langle f(\ulcorner \vec{\delta}, \vec{\epsilon} \urcorner), \alpha_0, \alpha_1 \rangle$ gets added to the workset W.

By the induction hypothesis, $G \vdash e_0 \Downarrow \ulcorner \delta_0, \epsilon_0 \urcorner \ldots G \vdash e_{n-1} \Downarrow \ulcorner \delta_{n-1}, \epsilon_{n-1} \urcorner$.

As in the previous case, when $\langle f(\ulcorner \vec{\delta}, \vec{\epsilon} \urcorner), \alpha_0, \alpha_1 \rangle$ gets drawn from the workset, G is updated so that $G(f(\ulcorner \vec{\delta}, \vec{\epsilon} \urcorner)) = \ulcorner \alpha_0, \alpha_1 \urcorner$. Thus, by rule fun, it is case that $G \vdash f(e_0, e_1, \ldots e_{n-1}) \Downarrow \ulcorner \alpha_0, \alpha_1 \urcorner$ Theorem 2 (Relative Completeness of Join $\mathcal{G}$):

If $G_0 \vdash e_0 \Downarrow \alpha_0$, $G_0 \vdash e_1 \Downarrow \alpha_0$, $G_1 \vdash e_0 \Downarrow \alpha_1$, and $G_1 \vdash e_1 \Downarrow \alpha_1$, then $G \vdash e_0 = e_1$.

Proof(direct): By Lemma III, $G \vdash e_0 \Downarrow \ulcorner \alpha_0, \alpha_1 \urcorner$ and $G \vdash e_1 \Downarrow \ulcorner \alpha_0, \alpha_1 \urcorner$. Thus, $G \vdash e_0 = e_1$ by rule eval.

7. Widen

Unfortunately, the above join operation for the combined implementation, when successively applied to an ascending chain of elements, may not stabilize (even without consideration of the base domains), as can demonstrated by the following example. Let $G_i$ (for $i \geq 0$) be an ascending chain of e-graphs representing $x = f^{2^i}(x)$. Then, $G'_0 = G_0 \; G'_1 = \text{Join } \mathcal{G}(G'_0, G_1) = G_1 \; G'_2 = \text{Join}$
$\mathcal{G}(G'_1, G_2) = G_2 \ldots$ does not reach a fixed point. The sequence does not converge because a cycle in the e-graph yields an infinite number of client expressions that evaluate to a symbolic value (by following the loop several times). Thus, a non-stabilizing chain can be constructed by joining with a chain that successively rules out terms that follow the loop less than k times (as given above). The same would be true for acyclic graphs with the join algorithm that adds additional terms to the e-graph as necessary to be complete. Therefore, a Widen$_C$ is defined in the combined implementation by following the join algorithm described in FIG. 14, except fixing a finite limit on the number of times a cycle can be followed in $G_0$, and calling Widen$_{\vec{B}}$ on the base domains rather than Join$_{\vec{B}}$. Once the e-graph part stabilizes, since the set of symbolic values are fixed up to renaming, the base domains will also stabilize by the stabilizing property of Widen$_{\vec{B}}$.

D. Heap Structures in the Combined Implementation.

In this section, handling of programs with heaps (such as object-oriented programs) in the combined implementation is considered. Since a heap may be viewed as an array indexed by heap locations, this section more generally applies also to arrays and records.

1. Heap-Aware Programs

The imperative programming language described above includes expressions to read object fields (o.x) and statements to update object fields (o.x:=e). To analyze a program, a program variable H represents the heap. The heap is an array indexed by heap locations $\langle o, x \rangle$, where o denotes an object identity and x is a field name.

A field read expression o.x is treated as shorthand for sel(H,o,x). Intuitively, this function retrieves the value of H at location $\langle o, x \rangle$. The congruence domain allows inferences about properties of programs that read fields. For example, using the polyhedra domain as a base domain on program (b) in FIG. 1, arithmetic properties like y=sel(H,o,x) $\wedge$ 0 $\leq$ sel(H, o,x) after the statement in the true-branch, and 0 $\leq$ y after the entire program, may be inferred.

The semantics of the field update statement o.x:=e are conventionally defined as an assignment H:=upd(H,o,x,e), where upd is a function with the following axiomatization:

sel(upd(H,o,x,e),o',x')=e if o=o' and x=x' sel(upd(H,o,x,e),o',x')=sel(H,o',x') if o≠o' or x≠x'

The heap succession predicate $H \equiv_{o,x} H'$ is slightly different formulation, which means H' is an updated heap equivalent to H everywhere except possibly at o.x. The field update statement o.x:=e may be regarded as the following assignment:

H:=H', where H' is such that $H \equiv_{o,x} H'$ and sel(H',o,x) =e.

Additional details on the semantics for the heap succession predicate are given above. Unfortunately, this is not enough to be useful in the analysis of certain heap-structured programs. Consider program (d) in FIG. 1. Applying the congruence domain with the polyhedra domain as a single base domain gives the disappointingly weak predicate true after the entire program. The problem is analysis of the field update statement effects a call to the operation Eliminate$_C$ ($\langle G, \vec{B} \rangle$, H) on the congruence domain, which results in the loss of information that syntactically depends on H. This is because no base domain $B_i$ is able to return an expression in response to the congruence domain's call to EquivalentExpr$_{B_i}$($B_i$,Q,sel(H,o, x),H) (more precisely, expression sel($\sigma,\phi,\chi$) and variable $\sigma$ are the corresponding symbolic values).

To remedy the situation, an abstract domain tracks heap updates. Simply including this abstract domain as a base domain in the congruence abstract domain solves this problem.

2. Heap Succession Abstract Domain

In the combined implementation, a lattice element in the heap succession abstract domain S represents false or a conjunction of heap succession predicates:

$(\exists \cdots \cdot H_0 \equiv_{o_0 \cdot x_0} H_1 \wedge H_1 \equiv_{o_1 \cdot x_1} H_2 \wedge \ldots \wedge H_{n-1} \equiv_{o_{n-1} \cdot x_{n-1}} H_n)$, for some $n \geq 0$, where the $H_i$, $o_i$, and $x_i$ are variables, some of which may be existentially bound, and where no $H_i$ is repeated.

The heap succession domain, like any other base domain in the combined implementation, works with variables and implements the abstract domain interface. It can often return useful results to EquivalentExpr calls. Specifically, it substitutes newer heap variables for older heap variables in expressions when it is sound to do so. The operation EquivalentExpr$_S$ (S,Q,t,H) returns nothing unless t has the form sel(H,o,x) and element S contains a successor of heap H. If there is a heap successor H' of H (that is, if S contains a predicate $H \equiv_{p,y} H'$), then S first determines whether $o \neq p \vee x \neq y$ (i.e., whether the references o and p are known to be un-aliased or the fields are distinct). If it finds that $o \neq p \vee x \neq y$ and H' is not existentially bound, then the operation returns the expression sel(H',o,x); otherwise, the operation iterates, this time looking for a heap successor of H'. If x and y denote two different fields (which are represented as 0-ary functions), the condition is easy to determine. If not, the heap succession domain may need to query other abstract domains via Q to find out if any other abstract domain knows that $o \neq p$.

3. Preserving Information Across Heap Updates

An example may help illustrate how the heap succession domain can allow information to be preserved across heap updates. Consider a heap update statement o.x:=z and suppose that before the update, the abstract domains have the information that p.y=8 (i.e., sel (H, p, y)=8). After the update to o.x, a goal is to preserve this information, since the update is to a different field name. Consider the relevant mappings in the e-graph after the update:

| | $H \mapsto \sigma'$ | $\text{sel}(\sigma, \psi, \upsilon) \mapsto \alpha$ | $\text{sel}(\sigma', \phi, \chi) \mapsto \zeta$ |
|---|---|---|---|
| $p \mapsto \psi$ | $o \mapsto \phi$ | $8 \mapsto \alpha$ | $z \mapsto \zeta$ |
| $y \mapsto \upsilon$ | $x \mapsto \chi$ | | |

The heap succession domain has the following constraint: $\sigma \equiv_{\phi,\chi} \sigma'$. After the update, the old heap $\sigma$ is a garbage value. During garbage collection, before $\sigma$ is eliminated from the base domain, the congruence domain calls EquivalentExpr$_{B_i}$ to ask each base domain $B_i$ whether it can give an equivalent expression for sel($\sigma,\psi,\upsilon$) without $\sigma$. In this case, the heap succession domain can return sel($\sigma',\psi,\upsilon$) because field name constants x and y are distinct. Thus, the information that sel(H,p,y)=8 is preserved. In the same way, the congruence domain with heap succession and polyhedra as base domains computes $0 \leq o.x \wedge N \leq o.x \wedge 0 \leq p.y$ after program (d) in FIG. 1.

VI. Conclusion and Other Applications

The present application describes congruence domains and base domains, recognizing that symbolic values can be used to hide alien expressions. With the techniques described herein, an abstract domain may be extended to handle constraints over arbitrary terms, not just variables. A coordinating abstract domain of congruences facilitates this extension. With the mapping of arbitrary terms to variables, existing abstract domains can otherwise be used as unmodified, the extended abstract domain oblivious to its extended reasoning.

The present application also describes how to use an abstract interpretation framework to infer properties of programs that involve heap structures and uninterpreted function symbols, even getting useful results in the presence of heap updates. A heap succession domain allows an analysis framework to handle heap updates. This domain may be an independent abstract domain, or fit modularly into a congruence domain framework as a base domain, or fit into some other analysis framework. The handling of heap updates can be improved modularly through other base domains that yield better alias (or rather, un-aliased) information.

The techniques described herein have been incorporated in the abstract interpretation engine of the Spec# program verifier, which is part of the Spec# programming system.

Example implementations of the congruence domain involve joining e-graphs. More generally, the techniques and tools described herein may be applied to join e-graphs in other contexts.

Assigning symbolic values to sub-expressions of alien expressions, as well as notifying base domains of additional understandable sub-expressions, shares information between abstract domains. Equality information flows from the congruence domain to the base domains to achieve cooperating abstract domains. A particular base domain may also propagate information, like equalities that it discovers, to the congruence domain and other base domains.

With the polyhedra domain as a base domain, the congruence abstract domain may be used for other purposes as well, for example, for join algorithms for both uninterpreted functions and linear arithmetic, or for inferring object invariants.

The polyhedra domain and heap succession abstract domain are examples of base domains. Another potential base domain is a shape analyzer, which determines patterns of connectivity between pointers in a heap. Using transitive closure, shape analysis can reason about reachability in the heap and abstract many heap objects into summary nodes. In shape analysis, properties of nodes can be encoded as specially interpreted predicates, and such properties may be analyzed in a framework with a congruence domain and polyhedra domain, for example.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer system comprising:
   computer memory and a central processing unit; and
   a tool stored in the computer memory and executable by the central processing unit, wherein the tool comprises:
   plural base domains comprising respective pluralities of base domain variables, wherein at least one of the plural base domains supports analysis of different functions than an other of the plural base domains; and
   a congruence domain parameterized by the plural base domains, wherein the congruence domain is configured to infer symmetric relationships, reflexive relationships, transitive relationships, and whether expressions evaluate to a same base domain value;
   wherein the tool further comprises at least one equivalence graph mapping alien expressions to the base domain variables, and wherein the equivalence graph tracks equalities between terms and maps equal expressions to a same value, wherein the expressions comprise program text variables or program functions; and
   wherein the tool implementing the congruence domain operates in conjunction with the plural base domains to query the plural base domains for a replacement expression for a given expression, wherein the replacement expression does not mention a particular variable.

2. The computer system of claim 1 wherein the plural base domains include a heap succession domain that facilitates tracking of heap updates.

3. The computer system of claim 1 wherein the tool implementing the congruence domain operates in conjunction with the plural base domains to query each of the plural base domains about what expression information is understandable by each of the plural base domains, and to receive from each of the plural base domains information about what expression information is understandable within each of the plural base domains.

4. The computer system of claim 3 wherein the expression information is a function or relation symbol and its argument expressions.

5. The computer system of claim 1 wherein the tool also facilitates replacement of plural expressions having garbage values with plural equivalent expressions lacking the garbage values.

6. The computer system of claim 1 wherein, when adding constraints, the tool operates in conjunction with one or more base domains to identify the alien expressions based at least in part upon which of plural functions and/or relation symbols of a client computer program are supported in the one or more base domains.

7. The computer system of claim 1 wherein the tool operates in conjunction with one or more of the plural base domains to determine garbage values and to perform garbage collection for the determined garbage values.

8. A computer-implemented method comprising:

in a computer, representing plural base domains comprising respective pluralities of base domain variables, wherein at least one of the plural base domains supports analysis of different functions than an other of base domains of the plural base domains;

in the computer, implementing a congruence domain parameterized by the plural base domains, wherein the implementing comprises inferring symmetric relationships, inferring reflexive relationships, inferring transitive relationships, and inferring whether expressions evaluate to a same base domain value; and in the computer, representing at least one equivalence graph mapping alien expressions to the base domain variables, wherein the representing comprises tracking equalities between terms and mapping equal expressions to a same value, wherein the expressions comprise program text variables or program functions;

identifying, for one of the base domains, an expression having one or more unreachable values;

determining an equivalent expression that lacks the one or more unreachable values;

requesting the equivalent expression from another base domain for use in the determining the equivalent expression;

if available via the requesting, receiving the requested equivalent expression, and replacing the expression of the one of the base domains that has the one or more unreachable values with the requested equivalent expression; and otherwise, removing mapping with the one or more unreachable values from the equivalence graph, and eliminating the one or more unreachable values from the one of the base domains.

9. The method of claim 8 wherein software implementing the base domain provides information about what expression information is understandable within the base domain.

10. A computer-implemented method comprising:

in a computer, representing plural base domains comprising respective pluralities of base domain variables, wherein one or more of the plural base domains supports analysis of different functions than an other of the plural base domains;

in the computer, implementing a congruence domain parameterized by the plural base domains, wherein the implementing comprises inferring symmetric relationships, inferring reflexive relationships, inferring transitive relationships, and inferring whether expressions evaluate to a same base domain value; and in the computer, representing at least one equivalence graph mapping alien expressions to the base domain variables, wherein the representing comprises tracking equalities between terms and mapping equal expressions to a same value, wherein the expressions comprise program text variables or program functions;

in at least one of the plural base domains, tracking one or more updates to a memory pool, wherein software implementing the at least one of the plural base domains facilitates replacement of expressions having one or more unreachable values; and for an unreachable heap:

if a heap successor exists, providing the heap successor for replacement of the unreachable heap; and otherwise, eliminating the unreachable heap;

wherein the at least one of the plural base domains includes one or more succession predicates for the tracking, and wherein each of the one or more succession predicates indicates one of the one or more updates.

11. The method of claim 10 wherein the one or more updates include a change for a field of an object of an object-oriented computer program, for an element of an array, or for a field of a record.

12. The method of claim 10 wherein the software implementing the at least one of the plural base domains also provides information about what symbols are understandable within the at least one of the plural base domains.

13. The computer system of claim 3 wherein if query results indicate that a given expression is not supported, the tool replaces the given unsupported expression with a base domain variable.

14. The computer system of claim 13 wherein the tool tracks a mapping of the given unsupported expression to a base domain variable in one of the plural base domains.

15. One or more computer-readable storage media having encoded thereon computer-executable instruction causing a computer to perform a method comprising:

in the computer, representing plural base domains comprising respective pluralities of base domain variables, wherein at least one of the plural base domains supports analysis of different functions than an other of the plural base domains;

in the computer, implementing a congruence domain parameterized by the plural base domains, wherein the implementing comprises inferring symmetric relationships, inferring reflexive relationships, inferring transitive relationships, and inferring whether expressions evaluate to a same base domain value; and in the computer, representing at least one equivalence graph mapping alien expressions to the base domain variables, wherein the representing comprises tracking equalities between terms and mapping equal expressions to a same value, wherein the expressions comprise program text variables or program functions;

wherein at least one of the plural base domains comprises a heap succession abstract domain configured to track updates to a heap; and wherein the heap succession abstract domain performs a method comprising:

for an unreachable heap:

if a heap successor exists, providing a heap successor for replacement of the unreachable heap; and otherwise, eliminating the unreachable heap.

16. The method of claim 15 wherein the congruence domain introduces variables for use in a given base domain to stand for sub-expressions that are alien to the given base domain.

* * * * *